United States Patent
Koike et al.

(10) Patent No.: US 8,024,812 B2
(45) Date of Patent: Sep. 20, 2011

(54) APPARATUS AND METHOD FOR PROCESSING DIGITAL DOCUMENT AND COMPUTER PROGRAM

(75) Inventors: Hisashi Koike, Sakura (JP); Katsushi Sunagawa, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 12/033,634

(22) Filed: Feb. 19, 2008

(65) Prior Publication Data

US 2008/0209509 A1   Aug. 28, 2008

(30) Foreign Application Priority Data

Feb. 22, 2007  (JP) ................. 2007-042434

(51) Int. Cl.
   *G06F 7/04* (2006.01)
(52) U.S. Cl. ............. 726/27; 726/26; 726/2; 726/16; 726/21; 713/164; 713/165; 713/166; 713/167
(58) Field of Classification Search .......... 726/2, 16–17, 726/21, 27
See application file for complete search history.

(56) References Cited

U.S. PATENT DOCUMENTS

| 6,237,099 B1 * | 5/2001 | Kurokawa ............... 726/4 |
| 2006/0045555 A1 * | 3/2006 | Morimoto et al. ............. 399/80 |

FOREIGN PATENT DOCUMENTS

| JP | 10-208020 A | 8/1998 |
| JP | 2001-117687 A | 4/2001 |
| JP | 2003-256216 A | 9/2003 |

OTHER PUBLICATIONS

Steve Teixeira , David Intersimone, Delphi 5 Developer's Guide with Cdrom, Macmillan Publishing Co., Inc., Indianapolis, IN, 1999.*
Look-up table, plug-in. (2000). In Collins Dictionary of Computing.*
McPherson, Dave . "Role-Based Access Control for Multi-tier Applications Using Authorization Manager." Microsoft Technet. Jul. 31, 2004. <http://technet.microsoft.com/en-us/library/cc780256(WS.10).aspx>.*
"Partition (database)." Wikipedia. Oct. 5, 2006. Wikimedia Foundation, Inc.. <http://web.archive.org/web/20061005082203/http://en.wikipedia.org/wiki/Partition_(database)>.*

* cited by examiner

*Primary Examiner* — Kambiz Zand
*Assistant Examiner* — Imhotep Durham
(74) *Attorney, Agent, or Firm* — Canon U.S.A. Inc., I.P. Division

(57) ABSTRACT

A digital document processing apparatus stores a digital document, an application program used for editing the digital document, where the application program runs on an application platform, and a filter program used for restricting a function executed by the application program. The digital document processing apparatus includes a function determination unit configured to determine whether a function executed by the application program is restricted by the filter program, and a function restricting unit configured to restrict the function executed by the application program using the filter program if the function determination unit determines that the function executed by the application program is restricted by the filter program.

18 Claims, 23 Drawing Sheets

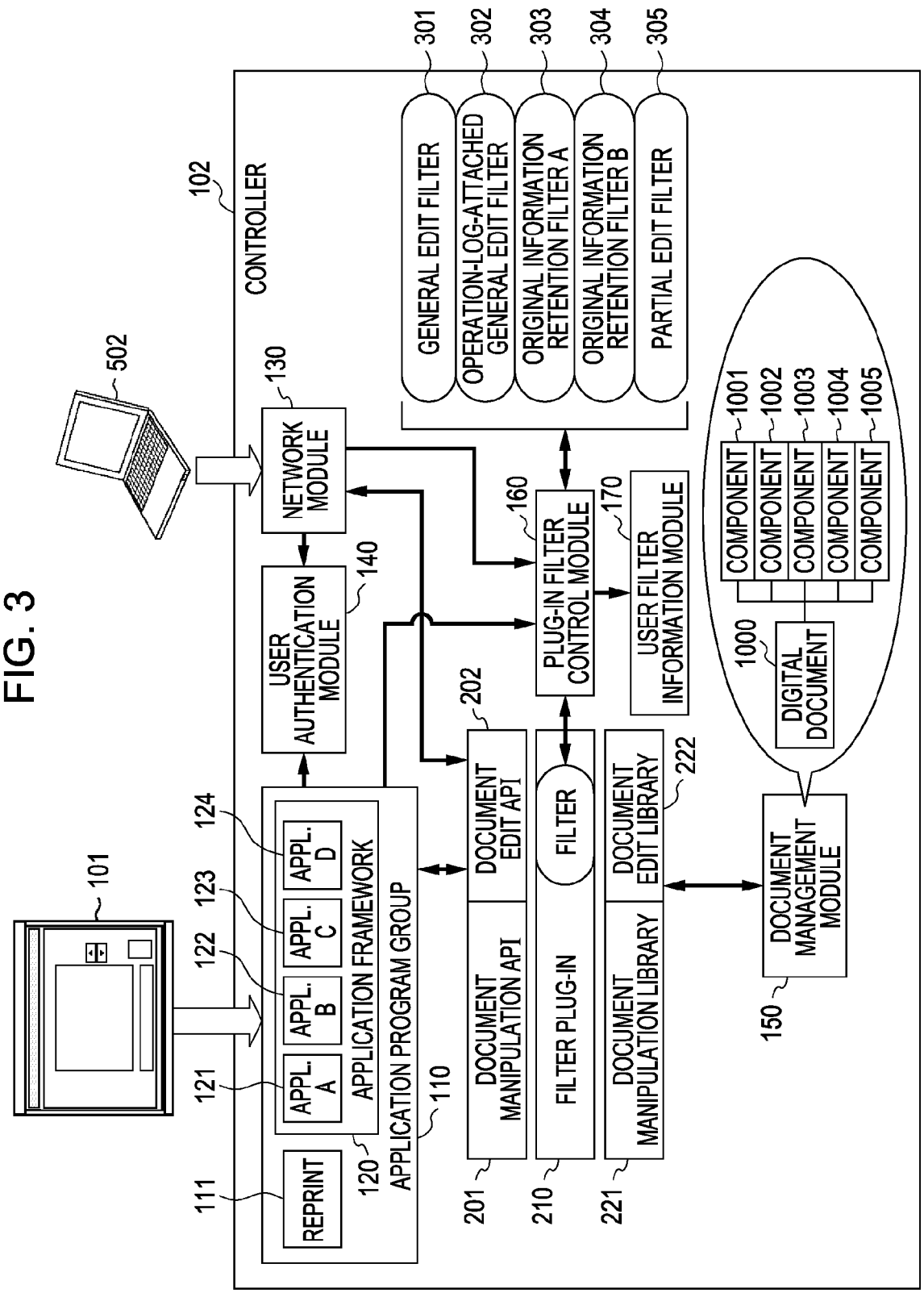

| CALLED API | | PRE-PROCESSING | API ACTUALLY CALLED | | |
|---|---|---|---|---|---|
| | | | MAIN PROCESSING | POST-PROCESSING |
| DOCUMENT MANIPULATION | OpenDocument() | | X_OpenDocument() | |
| | CloseDocument() | | X_CloseDocument() | |
| | OpenPage() | | X_OpenPage() | |
| | ClosePage() | | X_ClosePage() | |
| | WriteModifiedDate() | | X_WriteModifiedDate() | |
| | WriteAuthorName() | | X_WriteAuthorName() | |
| | WriteEditorName() | | X_WriteEditorName() | |
| | SaveDocument() | | X_SaveDocument() | |
| | .. | .. | .. | .. |
| DOCUMENT EDIT | TextFont() | | X_TextFont() | |
| | TextColor() | | X_TextColor() | |
| | PathFillPattern() | | X_PathFillPattern() | |
| | PathFillColor() | | X_PathFillColor() | |
| | PathLinePattern() | | X_PathLinePattern() | |
| | PathLineColor() | | X_PathLineColor() | |
| | addObject() | | X_addObject() | |
| | deleteObject() | | X_deleteObject() | |
| | .. | .. | .. | .. |

| CALLED API | | API ACTUALLY CALLED | | |
|---|---|---|---|---|
| | | PRE-PROCESSING | MAIN PROCESSING | POST-PROCESSING |
| DOCUMENT MANIPULATION | OpenDocument() | | X_OpenDocument() | X_Log() |
| | CloseDocument() | | X_CloseDocument() | X_Log() |
| | OpenPage() | | X_OpenPage() | X_Log() |
| | ClosePage() | | X_ClosePage() | X_Log() |
| | WriteModifiedDate() | | X_WriteModifiedDate() | X_Log() |
| | WriteAuthorName() | | X_WriteAuthorName() | X_Log() |
| | WriteEditorName() | | X_WriteEditorName() | X_Log() |
| | SaveDocument() | | X_SaveDocument() | X_Log() |
| | .. | .. | .. | .. |
| DOCUMENT EDIT | TextFont() | | X_TextFont() | X_Log() |
| | TextColor() | | X_TextColor() | X_Log() |
| | PathFillPattern() | | X_PathFillPattern() | X_Log() |
| | PathFillColor() | | X_PathFillColor() | X_Log() |
| | PathLinePattern() | | X_PathLinePattern() | X_Log() |
| | PathLineColor() | | X_PathLineColor() | X_Log() |
| | addObject() | | X_addObject() | X_Log() |
| | deleteObject() | | X_deleteObject() | X_Log() |
| | .. | .. | .. | .. |

| | CALLED API | API ACTUALLY CALLED | | |
|---|---|---|---|---|
| | | PRE-PROCESSING | MAIN PROCESSING | POST-PROCESSING |
| DOCUMENT MANIPULATION | OpenDocument() | X_Duplicate (original doc, different doc) | X_OpenDocument (different doc) | X_CallBackMessage() |
| | CloseDocument() | | X_CloseDocument (different doc) | |
| | OpenPage() | | X_OpenPage() | |
| | ClosePage() | | X_ClosePage() | |
| | WriteModifiedDate() | | X_WriteModifiedDate() | |
| | WriteAuthorName() | | X_WriteAuthorName() | |
| | WriteEditorName() | | X_WriteEditorName() | |
| | SaveDocument() | X_CallBackMessage() | X_SaveDocument (different doc) | |
| | ‥ | ‥ | ‥ | ‥ |
| DOCUMENT EDIT | TextFont() | | X_TextFont() | |
| | TextColor() | | X_TextColor() | |
| | PathFillPattern() | | X_PathFillPattern() | |
| | PathFillColor() | | X_PathFillColor() | |
| | PathLinePattern() | | X_PathLinePattern() | |
| | PathLineColor() | | X_PathLineColor() | |
| | addObject() | | X_addObject() | |
| | deleteObject() | | X_deleteObject() | |
| | ‥ | ‥ | ‥ | ‥ |

| | CALLED API | PRE-PROCESSING | API ACTUALLY CALLED MAIN PROCESSING | POST-PROCESSING |
|---|---|---|---|---|
| DOCUMENT MANIPULATION | OpenDocument () | X_Duplicate (original doc, new doc) | X_OpenDocument (original doc) | |
| | CloseDocument () | | X_CloseDocument (original doc) | X_CheckMod (original doc, new doc, X_Delete(new doc)) |
| | OpenPage () | | X_OpenPage () | |
| | ClosePage () | | X_ClosePage () | |
| | WriteModifiedDate () | | X_WriteModifiedDate () | |
| | WriteAuthorName () | | X_WriteAuthorName () | |
| | WriteEditorName () | | X_WriteEditorName () | |
| | SaveDocument () | | X_SaveDocument (original doc) | |
| | .. | .. | .. | .. |
| DOCUMENT EDIT | TextFont () | | X_TextFont () | |
| | TextColor () | | X_TextColor () | |
| | PathFillPattern () | | X_PathFillPattern () | |
| | PathFillColor () | | X_PathFillColor () | |
| | PathLinePattern () | | X_PathLinePattern () | |
| | PathLineColor () | | X_PathLineColor () | |
| | addObject () | | X_addObject () | |
| | deleteObject () | | X_deleteObject () | |
| | .. | | .. | .. |

| CALLED API | | PRE-PROCESSING | API ACTUALLY CALLED | |
|---|---|---|---|---|
| | | | MAIN PROCESSING | POST-PROCESSING |
| DOCUMENT MANIPULATION | OpenDocument() | | X_OpenDocument() | |
| | CloseDocument() | | X_CloseDocument() | |
| | OpenPage() | | X_OpenPage() | |
| | ClosePage() | | X_ClosePage() | |
| | WriteModifiedDate() | | X_WriteModifiedDate() | |
| | WriteAuthorName() | | X_WriteAuthorName() | |
| | WriteEditorName() | | X_WriteEditorName() | |
| | SaveDocument() | | X_SaveDocument() | |
| | .. | .. | .. | .. |
| DOCUMENT EDIT | TextFont() | | X_TextFont() | |
| | TextColor() | | X_TextColor() | |
| | PathFillPattern() | | X_PathFillPattern() | |
| | PathFillColor() | | X_PathFillColor() | |
| | PathLinePattern() | | X_PathLinePattern() | |
| | PathLineColor() | | X_PathLineColor() | |
| | addObject() | X_CallBackMessage() | | |
| | deleteObject() | X_CallBackMessage() | | |
| | .. | .. | .. | .. |

FIG. 19

LEVEL-1 TABLE

311

| CALLED API | PRE-PROCESSING | MAIN PROCESSING | POST-PROCESSING | SWITCHING LEVEL |
|---|---|---|---|---|
| OpenDocument() | | X_OpenDocument() | | |
| CloseDocument() | | X_CloseDocument() | | |
| OpenPage() | | X_OpenPage() | | |
| ClosePage() | | X_ClosePage() | | |
| WriteModifiedDate() | | X_WriteModifiedDate() | X_CallBackMessage() | 2 |
| WriteAuthorName() | | X_WriteAuthorName() | X_CallBackMessage() | 2 |
| WriteEditorName() | | X_WriteEditorName() | X_CallBackMessage() | 2 |
| SaveDocument() | | X_SaveDocument() | | |
| .. | .. | .. | .. | .. |
| TextFont() | | X_TextFont() | | |
| TextColor() | | X_TextColor() | | |
| PathFillPattern() | | X_PathFillPattern() | | |
| PathFillColor() | | X_PathFillColor() | | |
| PathLinePattern() | | X_PathLinePattern() | | |
| PathLineColor() | | X_PathLineColor() | | |
| addObject() | | X_addObject() | | 2 |
| deleteObject() | | X_deleteObject() | | 2 |
| .. | | .. | | .. |

Rows grouped as: DOCUMENT MANIPULATION (upper) and DOCUMENT EDIT (lower).

LEVEL-2 TABLE

| | CALLED API | PRE-PROCESSING | MAIN PROCESSING | POST-PROCESSING | SWITCHING LEVEL |
|---|---|---|---|---|---|
| DOCUMENT MANIPULATION | OpenDocument() | X_Log() | X_OpenDocument() | | LEVEL AT START TIME |
| | CloseDocument() | X_Log() | X_CloseDocument() | | |
| | OpenPage() | X_Log() | X_OpenPage() | | |
| | ClosePage() | X_Log() | X_ClosePage() | | |
| | WriteModifiedDate() | X_Log() | | X_CallBackMessage() | 3 |
| | WriteAuthorName() | X_Log() | | X_CallBackMessage() | 3 |
| | WriteEditorName() | X_Log() | | X_CallBackMessage() | 3 |
| | SaveDocument() | X_Log() | X_SaveDocument() | | |
| | .. | .. | .. | .. | .. |
| DOCUMENT EDIT | TextFont() | X_Log() | X_TextFont() | | |
| | TextColor() | X_Log() | X_TextColor() | | |
| | PathFillPattern() | X_Log() | X_PathFillPattern() | | |
| | PathFillColor() | X_Log() | X_PathFillColor() | | |
| | PathLinePattern() | X_Log() | X_PathLinePattern() | | |
| | PathLineColor() | X_Log() | X_PathLineColor() | | |
| | addObject() | X_Log() | X_addObject() | | |
| | deleteObject() | X_Log() | X_deleteObject() | | |
| | .. | .. | .. | | .. |

LEVEL-3 TABLE

| CALLED API | | PRE-PROCESSING | MAIN PROCESSING | POST-PROCESSING | SWITCHING LEVEL |
|---|---|---|---|---|---|
| DOCUMENT MANIPULATION | OpenDocument() | | | X_CallBackMessage() | |
| | CloseDocument() | | X_CloseDocument() | X_CallBackMessage() | LEVEL AT START TIME |
| | OpenPage() | | | X_CallBackMessage() | |
| | ClosePage() | | | X_CallBackMessage() | |
| | WriteModifiedDate() | | | X_CallBackMessage() | |
| | WriteAuthorName() | | | X_CallBackMessage() | |
| | WriteEditorName() | | | X_CallBackMessage() | |
| | SaveDocument() | | | X_CallBackMessage() | |
| | .. | .. | .. | .. | .. |
| DOCUMENT EDIT | TextFont() | | | X_CallBackMessage() | |
| | TextColor() | | | X_CallBackMessage() | |
| | PathFillPattern() | | | X_CallBackMessage() | |
| | PathFillColor() | | | X_CallBackMessage() | |
| | PathLinePattern() | | | X_CallBackMessage() | |
| | PathLineColor() | | | X_CallBackMessage() | |
| | addObject() | | | X_CallBackMessage() | |
| | deleteObject() | | | X_CallBackMessage() | |
| | .. | | | | .. |

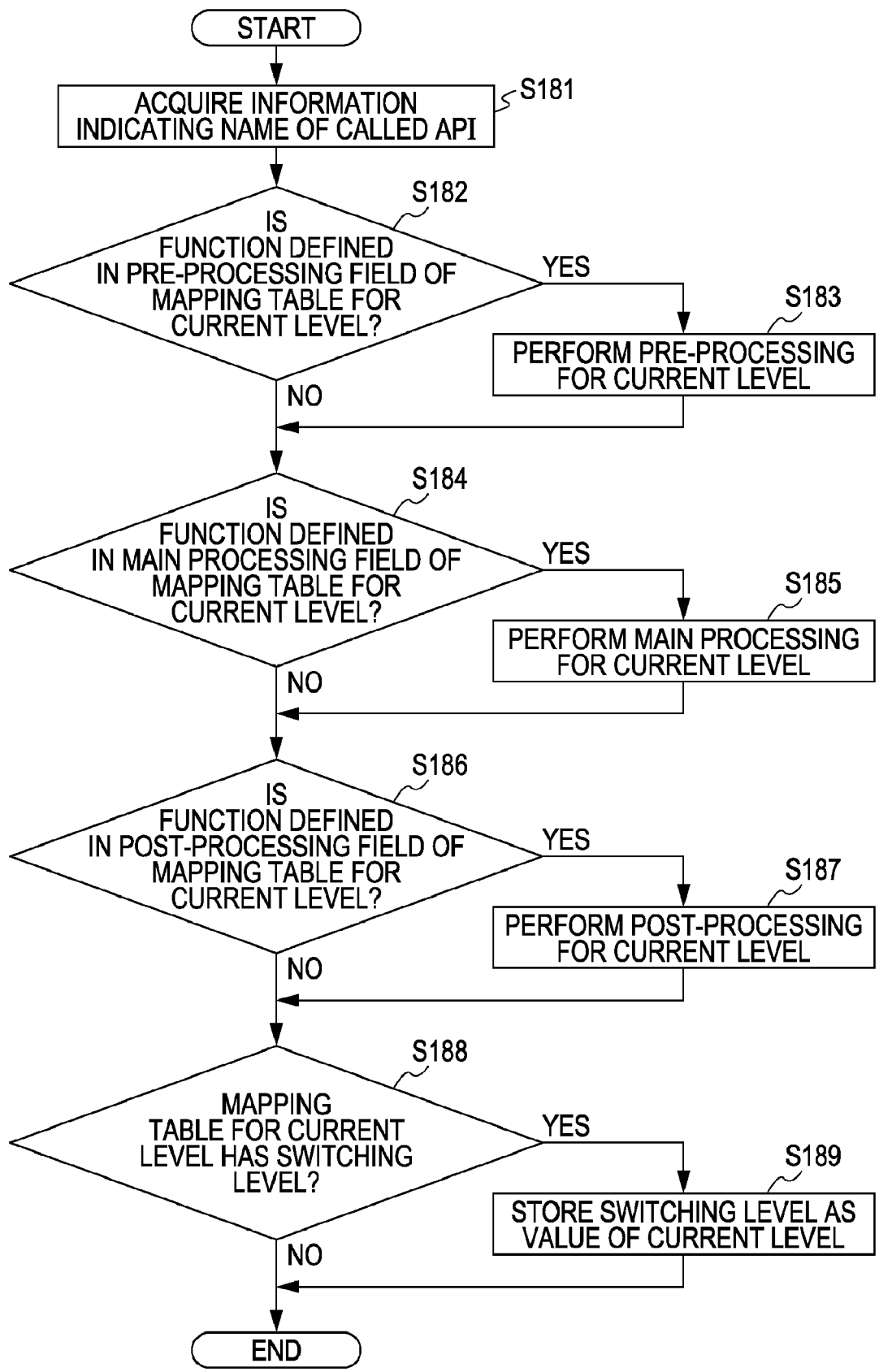

APPARATUS AND METHOD FOR PROCESSING DIGITAL DOCUMENT AND COMPUTER PROGRAM

BACKGROUND OF THE INVENTION

1. Field of the Invention

The present invention relates to an apparatus and a method for processing a digital document and a computer program and, in particular, to an apparatus and a method for processing a digital document and a computer program that are suitable for processing a digital document stored in the apparatus.

2. Description of the Related Art

In recent years, multi-function printers (MFPs) have been able to store documents therein in a digital form in addition to copying documents and printing data written in page description language (PDL). Examples of such stored digital documents include documents scanned by a scanner and documents transmitted from a host computer in a PDL format. In addition, some MFPs can analyze the page description language so as to separate page data into image components. By storing the digital document on an image-component basis, MFPs can allow users to edit the digital document on an image-component basis and reuse the document (refer to, for example, Japanese Patent Laid-Open No. 10-208020).

Furthermore, some MFPs allow users to download a functional program in order to replace an old one with the new one. A software development kit (SDK) for developing a program that uses a function of an MFP is provided to users. Manufacturers, sales companies, and third parties can develop their own application programs using the SDK. Users can purchase these application programs to download the application programs into MFPs. In this way, the users can use functions that are not offered originally or that have improved operability (refer to, for example, Japanese Patent Laid-Open No. 2003-256216).

By using such a technology, users can develop an application program for editing and manipulating digital documents stored in MFPs. The users who use MFPs having such a function purchase a preferred edit application program and download the purchased edit application program into the MFPs so as to use the application program.

On the other hand, documents and images fall into two categories: those that can be freely edited and used and those that cannot be freely used due to copyright restrictions. Accordingly, documents that do not allow free use need to have a security setting in order not to be edited. For this purpose, a technology has been developed in which a function relating to an edit operation is automatically restricted so that users do not need to examine a security setting on an image basis when the users try to edit the document. Thus, the users are prevented from unintentionally editing the document and the images. In addition, a technology has been developed in which more precise control is performed by attaching edit-function level information that indicates an edit security level to each of the images (refer to, for example, Japanese Patent Laid-Open No. 2001-117687).

SUMMARY OF THE INVENTION

According to an embodiment of the present invention, a digital document processing apparatus includes a digital document storage unit to store a digital document, an application program storage unit to store an application program used for editing the digital document, where the application program runs on an application platform, a filter program storage unit to store a filter program used for restricting a function executed by the application program, a function determination unit configured to determine whether a function executed by the application program is restricted by the filter program, and a function restricting unit configured to restrict the function executed by the application program using the filter program if the function determination unit determines that the function executed by the application program is restricted by the filter program.

Further features of the present invention will become apparent from the following description of exemplary embodiments with reference to the attached drawings.

BRIEF DESCRIPTION OF THE DRAWINGS

FIG. 3 is a block diagram of an exemplary software configuration of the controller incorporated in an MFP according to the first embodiment of the present invention.

FIG. 4 illustrates an example of a mapping table contained in a general edit filter according to the first embodiment of the present invention.

FIG. 5 illustrates an example of a mapping table contained in an operation-log-attached general edit filter according to the first embodiment of the present invention.

FIG. 6 illustrates an example of a mapping table contained in an original information retention filter according to the first embodiment of the present invention.

FIG. 7 illustrates an example of a mapping table contained in the original information retention filter according to the first embodiment of the present invention.

FIG. 8 illustrates an example of a mapping table contained in a partial edit filter according to the first embodiment of the present invention.

FIG. 19 illustrates an example of a mapping table in level 1 according to the third embodiment of the present invention.

FIG. 20 illustrates an example of a mapping table in level 2 according to the third embodiment of the present invention.

FIG. 21 illustrates an example of a mapping table in level 3 according to the third embodiment of the present invention.

FIG. 23 is a flow chart illustrating an exemplary operation performed by a filter plug-in according to the third embodiment of the present invention.

DESCRIPTION OF THE EMBODIMENTS

First Embodiment

Figure 1:
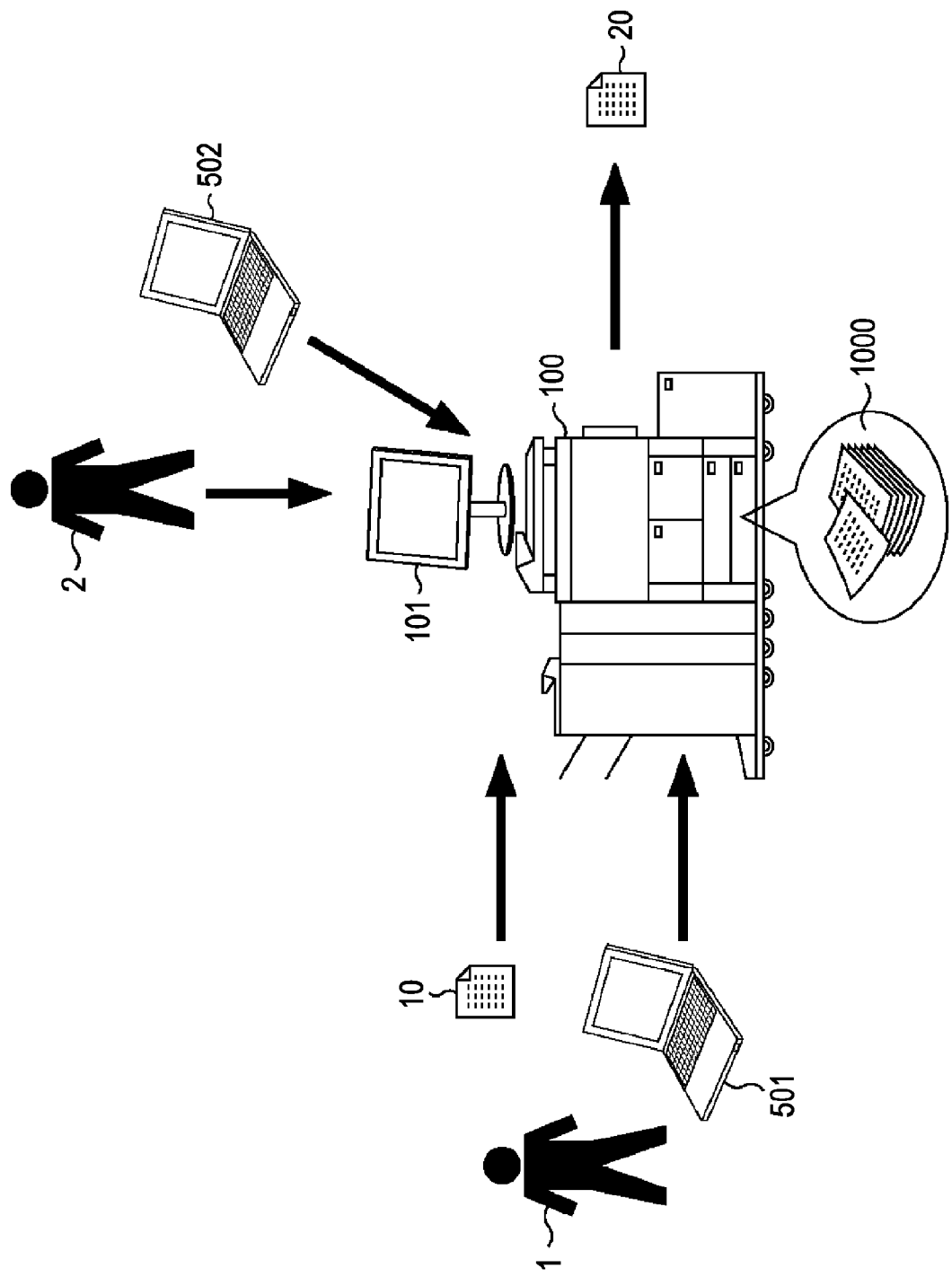
FIG. 1 is a schematic illustration of an example configuration of a printing system according to a first embodiment of the present invention.

A first embodiment of the present invention is described with reference to the accompanying drawings. FIG. 1 is a schematic illustration of an example configuration of a printing system. In FIG. 1, a user 1 operates an MFP 100 to store a document in the MFP 100. A user 2 edits a digital document 1000 stored in the MFP 100. A paper document 10 is scanned by a scanner of the MFP 100 in response to an operation of a user interface 101 performed by the user 1. Subsequently, the scanned document is stored in the MFP 100 as the digital document 1000. In addition, a paper document 20 is printed by a printing unit of the MFP 100 in response to an operation of the user interface 101 performed by the user 1.

A personal computer (PC) 501 is connected to the MFP 100 via a network. The PC 501 transmits image data in a PDL format. A PC 502 is connected to the MFP 100 via the network and manipulates the digital document 1000 stored in the MFP 100. A user 2 can edit and manipulate the digital document 1000 using the user interface 101 or the PC 502.

Figure 2:
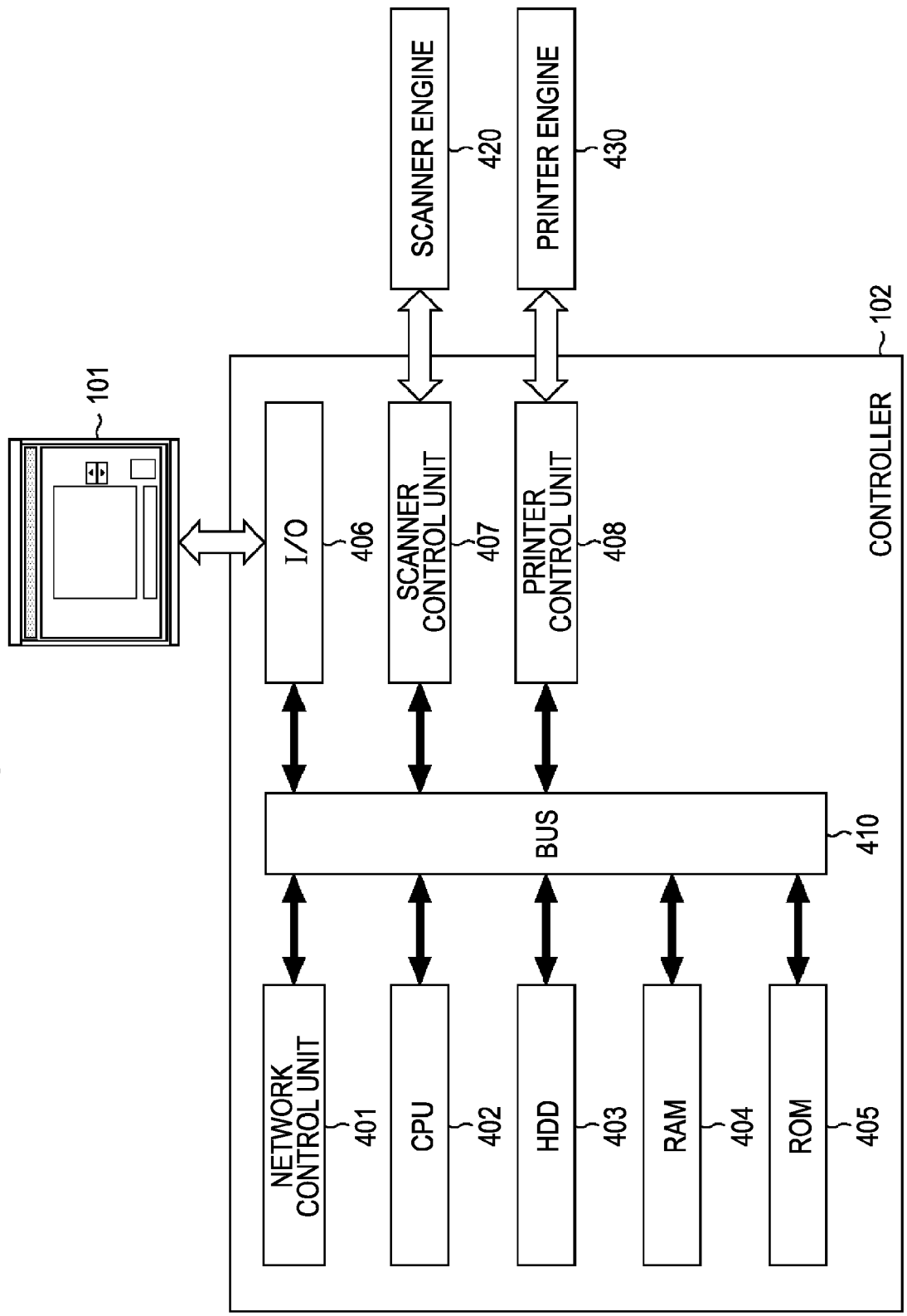
FIG. 2 is a block diagram of an exemplary hardware configuration of a controller incorporated in an MFP according to the first embodiment of the present invention.

FIG. 2 is a block diagram of hardware of a controller incorporated in the MFP 100, which is an example of a digital document processing apparatus. As illustrated in FIG. 2, a controller 102 performs overall control of the MFP 100. A network control unit 401 controls communication between the MFP 100 and the PCs 501 and 502 connected to the MFP 100 via a network. A central processing unit (CPU) 402 executes a program stored in a hard disk drive (HDD) 403 or a read only memory (ROM) 405 using a random access memory (RAM) 404 as a work area so as to perform overall control of the controller 102. The ROM 405 and the HDD 403 store programs and data. The RAM 404 serves as a work area or a storage area that temporarily stores data.

An I/O 406 controls the user interface 101. A scanner control unit 407 controls the operation of a scanner engine 420 that provides a scanner function. A printer control unit 408 controls the operation of a printer engine 430 that provides a printer function. These units 401 to 408 in the controller 102 are connected to each other via a bus 410.

FIG. 3 is a block diagram of exemplary software structure of the controller 102 incorporated in the MFP 100. Blocks illustrated in FIG. 3 communicate signals with each other so that the following various functions are provided.

As illustrated in FIG. 3, an application program group 110 includes a reprint application program (reprint) 111 and an application framework 120 that allows an application program to be downloaded from the outside. Edit application programs (applications A to D) 121 to 124 are executed on the application framework 120. According to the present embodiment, the edit application programs 121 to 124 are executed on the application framework 120. In addition, according to an embodiment, application program storage means (also referred to herein as "application program storage unit") is achieved using the application framework 120.

A network module 130 controls communication with apparatuses connected to the MFP 100 via a network (e.g., the PC 502). A user authentication module 140 authenticates a user who uses the application program group 110 on the basis of information input through the user interface 101. In addition, the user authentication module 140 authenticates a user who uses the function provided by the controller 102 on the basis of information input from the PC 502 via the network module 130.

A document management module 150 stores the digital document 1000. The digital document 1000 includes a plurality of components 1001 to 1005. In an embodiment, digital document storage means (also referred to herein as "digital document storage unit") is achieved using the document management module 150.

A plug-in filter control module 160 connects one of filters 301 to 305 to a filter plug-in 210 (i.e., the plug-in filter control module 160 performs setting of the filter plug-in 210) when the application program group 110 or the network module 130 starts. A user filter information module 170 stores information used for the plug-in filter control module 160 to select one of the filters 301 to 305 to be set for a user who uses the application program group 110.

In FIG. 3, one of the following filters is set: the general edit filter 301, the operation-log-attached general edit filter 302, the original information retention filter (an original information retention filter A) 303, the original information retention filter (an original information retention filter B) 304, and the partial edit filter 305. According to the present embodiment, the plurality of filters 301 to 305 are installed in the controller 102. Thus, the controller 102 can use the plurality of filters 301 to 305. Each of the plurality of filters 301 to 305 includes a program and a mapping table (described below). As noted above, according to the present embodiment, a filter program is achieved using, for example, the filters 301 to 305. The filters 301 to 305 are stored in a storage medium, such as the HDD 403, provided in the controller 102. In an embodiment, for example, filter program storage means (also referred to herein as "filter program storage unit") is achieved using the storage medium, such as the HDD 403, that stores the filters 301 to 305.

A document manipulation application program interface (API) 201 is an interface for providing a document manipulation function to the application program group 110. A document edit API 202 is an interface for providing a document edit function to the application program group 110. According to the present embodiment, for example, an edit and manipulation function interface is achieved using the document manipulation API 201 and the document edit API 202. The filter plug-in 210 selects one of the filters 301 to 305 and plugs in the selected filter.

A document manipulation library 221 can manipulate a digital document stored in the document management module 150. A document edit library 222 can edit a digital document stored in the document management module 150. According to the present embodiment, for example, an edit and manipulation function library is achieved using the document manipulation library 221 and the document edit library 222. In addition, by using functions contained in the document manipulation library 221 and the document edit library 222, edit and manipulation means (also referred to herein as "edit and manipulation functions" or "edit and manipulation unit") is achieved.

The above-described blocks (software) are stored in one of the HDD 403 and the ROM 405. The CPU 402 reads in and executes the blocks so as to perform overall control of the MFP 100.

More specifically, according to the present embodiment, as illustrated in FIG. 3, the platform of the controller 102 includes an interpreter running as a Java (trademark) virtual machine, a service manager, and a device control class library.

The service manager controls the operations of the edit application programs 121 to 124, such as addition, deletion, starting, and stopping of these edit application programs. The interpreter serving as a virtual machine is software that interprets and executes byte code of Java (trademark) for the application programs and the libraries. According to the present embodiment, an example of the application platform is the application framework 120 managed by the service manager.

The device control class library includes device control APIs serving as native methods of Java classes. The device control class library allows device-dependent code to be transparent to application programs. By calling an API group in a Java layer, which includes the device control APIs and non-device control APIs, an application program can perform a copy operation, a scan operation, and a document storing operation in a storage region. The document manipulation API 201 and the document edit API 202 illustrated in FIG. 3 are included in the API group in the Java layer. Note that, in addition to the application platform, a device control platform is provided.

FIG. 4 illustrates an example of a mapping table contained in the general edit filter 301. FIG. 5 illustrates an example of a mapping table contained in the operation-log-attached general edit filter 302. FIG. 6 illustrates an example of a mapping table contained in the original information retention filter 303. FIG. 7 illustrates an example of a mapping table contained in the original information retention filter 304. FIG. 8 illustrates an example of a mapping table contained in the partial edit filter 305. These mapping tables store rules for mapping a function called by the edit application programs 121 to 124 to another function.

Figure 9:
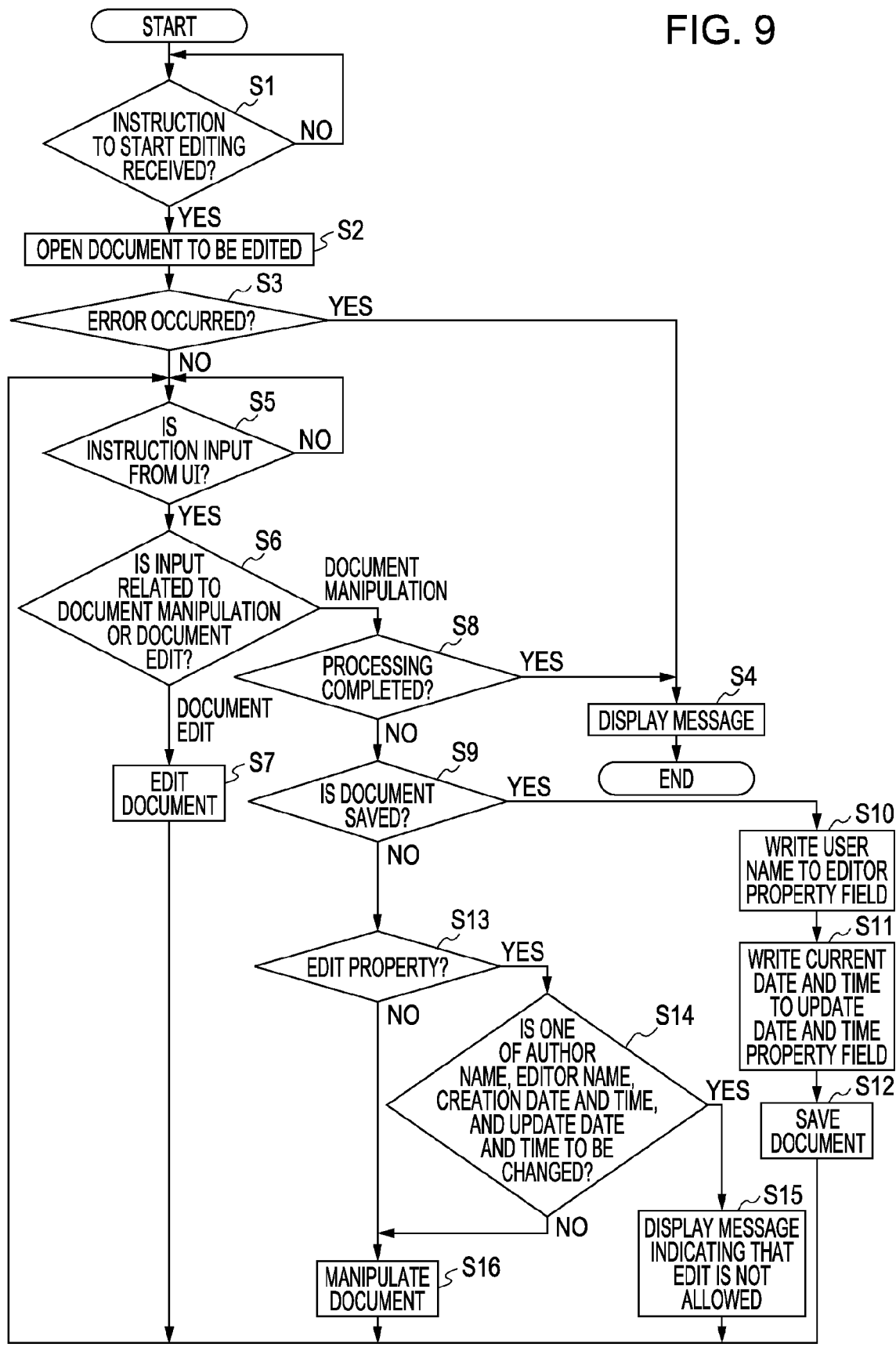
FIG. 9 is a flow chart of an exemplary operation performed by an edit application program (an application A) according to the first embodiment of the present invention.

FIG. 9 is a flow chart of an exemplary operation performed by the edit application program (an application A) 121. The edit application program 121 provides general functions and is preinstalled in the MFP 100. As illustrated in FIG. 9, the edit application program 121 waits until the user 2 operates the user interface of the MFP 100 and instructs to start editing the digital document 1000 using the edit application program 121 (step S1). Upon receiving a user instruction to start editing the digital document 1000 using the edit application program 121, the edit application program 121 opens the digital document 1000 to be edited using the document manipulation API 201 (step S2). Subsequently, the edit application program 121 determines whether an error, such as an open error of the digital document 1000 due to the absence of the digital document 1000, occurs or not (step S3). If an error has occurred, the edit application program 121 displays a message indicating that information on, for example, the user interface 101 (step S4) and completes the processing.

However, if any error has not occurred, the edit application program 121 waits for a further input from the user interface 101 (step S5). Upon receiving an input from the user interface 101, the edit application program 121 determines whether the user input is related to document editing or document manipulation (step S6).

If the user input is related to document editing, the edit application program 121 performs editing on a document using the document edit API 202 (step S7). Thereafter, the processing returns to step S5, where the edit application program 121 waits for the next input.

In contrast, if the user input is related to document manipulation, the edit application program 121 determines whether the input is an instruction to complete the processing (step S8). If the user input is an instruction to complete the processing, the edit application program 121 displays, on, for example, the user interface 101, a message indicating that the processing is being completed (step S4). Thereafter, the edit application program 121 completes the processing.

However, if the user input is not an instruction to complete the processing, the edit application program 121 determines whether the input is an instruction to save the document (step S9). If the user input is an instruction to save the document, the edit application program 121 writes the name of the user 2 in an editor property field of the document (step S10).

Subsequently, the edit application program 121 writes the current date and time in an update date-and-time property field (step S11). The edit application program 121 then saves the document (step S12). Thereafter, the processing returns to step S5.

If, at step S9, the edit application program 121 determines that the user input is not an instruction to save the document, the edit application program 121 then determines whether the input is an instruction to edit the property (step S13). If the input is an instruction to edit the property, the edit application program 121 determines whether one of an author, an editor, creation date and time, and update date and time is to be edited (step S14). If one of an author, an editor, creation date and time, and update date and time is to be edited, the edit application program 121 displays a message indicating the editing is not allowed on, for example, the user interface 101 (step S15). Thereafter, the processing returns to step S5.

If, at step S13, the user input is not an instruction to edit the property or if, at step S14, none of an author, an editor, creation date and time, and update date and time is to be edited, the processing proceeds to step S16. Subsequently, the edit application program 121 manipulates the digital document 1000 to be edited in accordance with the received instruction using the document manipulation API 201 (step S16). Thereafter, the processing returns to step S4.

Figure 10:
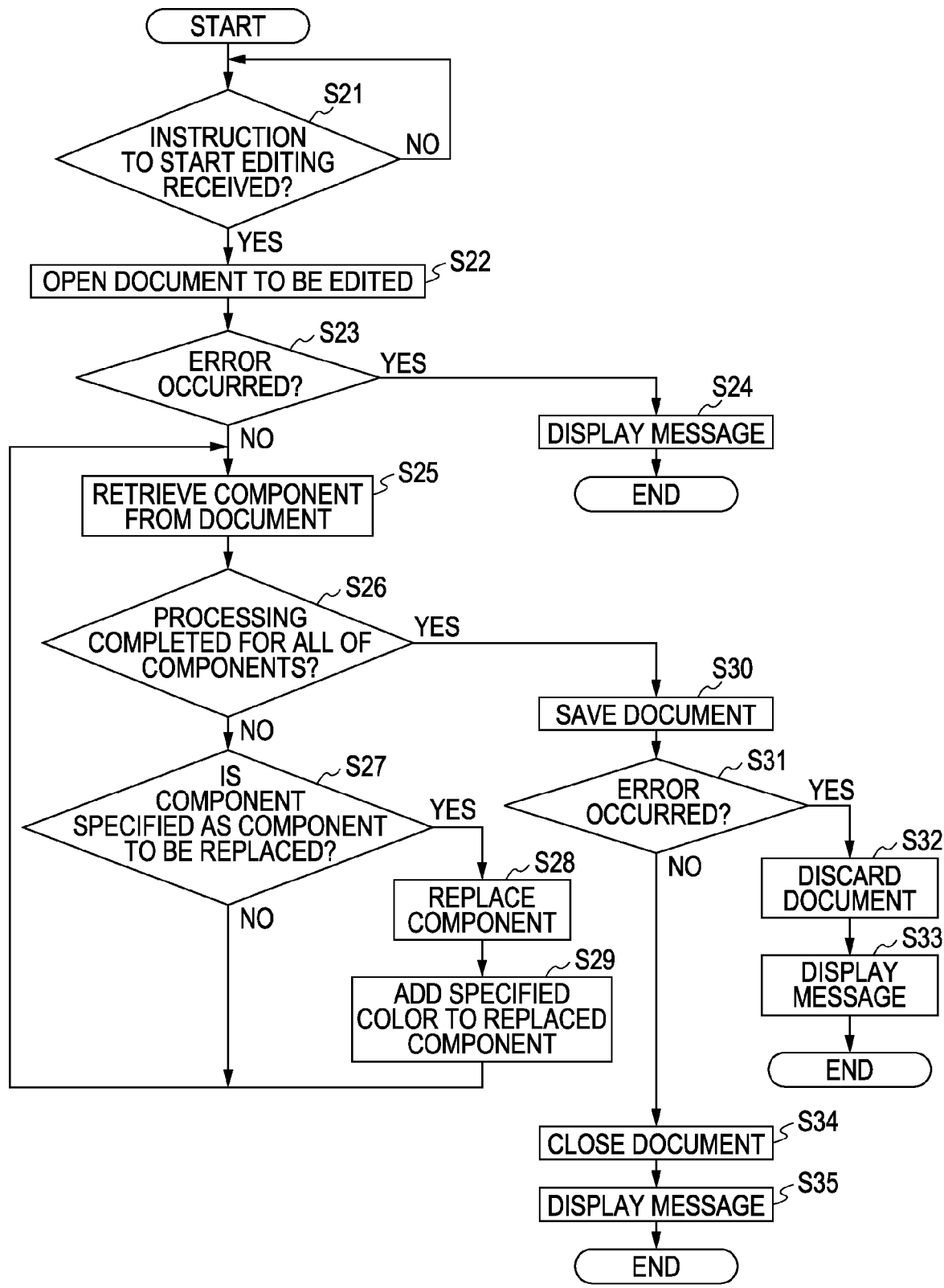
FIG. 10 is a flow chart of an exemplary operation performed by an edit application program (an application B) according to the first embodiment of the present invention.

FIG. 10 is a flow chart of an exemplary operation performed by the edit application program (application B) 122. The edit application program 122 searches for a specified component and replaces the found component with another one. In addition, the edit application program 122 adds a specified color to at least part of the replaced component. For example, the edit application program 122 is used in order to change all logos in a multi-page document at one time.

As illustrated in FIG. 10, the edit application program 122 waits until the user 2 operates the user interface 101 and instructs to start editing the digital document 1000 using the edit application program 122 (step S21). Upon receiving a user instruction to start editing the digital document 1000 using the edit application program 122, the edit application program 122 opens the digital document 1000 to be edited using the document manipulation API 201 (step S22).

Subsequently, the edit application program 122 determines whether an error, such as an open error of the digital document 1000 due to the absence of the digital document 1000, occurs or not (step S23). If an error has occurred, the edit application program 122 displays a message indicating that information on, for example, the user interface 101 (step S24) and completes the processing.

However, if any error has not occurred, the edit application program 122 examines all of the components 1001 to 1005 of the digital document 1000 to be edited. That is, the edit application program 122 retrieves the components 1001 to 1005 using the document edit API 202 (step S25). Subsequently, the edit application program 122 determines whether all of the components 1001 to 1005 of the digital document 1000 are processed by determining whether one of the components can be retrieved (step S26).

If one of the components 1001 to 1005 of the digital document 1000 to be edited can be retrieved (i.e., if all of the components 1001 to 1005 have not been processed), the processing proceeds to step S27. Thereafter, the edit application program 122 determines whether one of the components is specified to be replaced (step S27). If the retrieved component is specified to be replaced, the edit application program 122 performs a replacement operation of the component using the function of the document edit library 222 obtained using the document edit API 202 (step S28).

Subsequently, the edit application program 122 adds a specified color to the replaced component using a function of the document edit library 222 obtained using the document edit API 202 (step S29). Thereafter, the processing returns to step S25, from which similar operations are repeated for the next component.

If, at step S27, the retrieved component is not specified to be replaced, steps S28 and S29 are skipped. The processing then returns to step S25, from which similar operations are repeated for the next component.

If, at step S26, it is determined that all of the components 1001 to 1005 of the digital document 1000 have been processed, the processing proceeds to step S30. Subsequently, the edit application program 122 saves the digital document 1000 using the document manipulation API 201 (step S30). The edit application program 122 then determines whether an error has occurred (step S31).

If an error has occurred, the edit application program 122 discards the digital document 1000 to be edited (step S32) and displays a message indicating that information on, for example, the user interface 101 (step S33). Thereafter, the processing is completed.

However, if an error has not occurred, the edit application program 122 determines that editing has been completed normally, and the edit application program 122 closes the digital document 1000 (step S34). Thereafter, the edit application program 122 displays a message indicating that the digital document 1000 is edited normally on, for example, the user interface 101 (step S35). Thereafter, the processing is completed.

Figure 11:
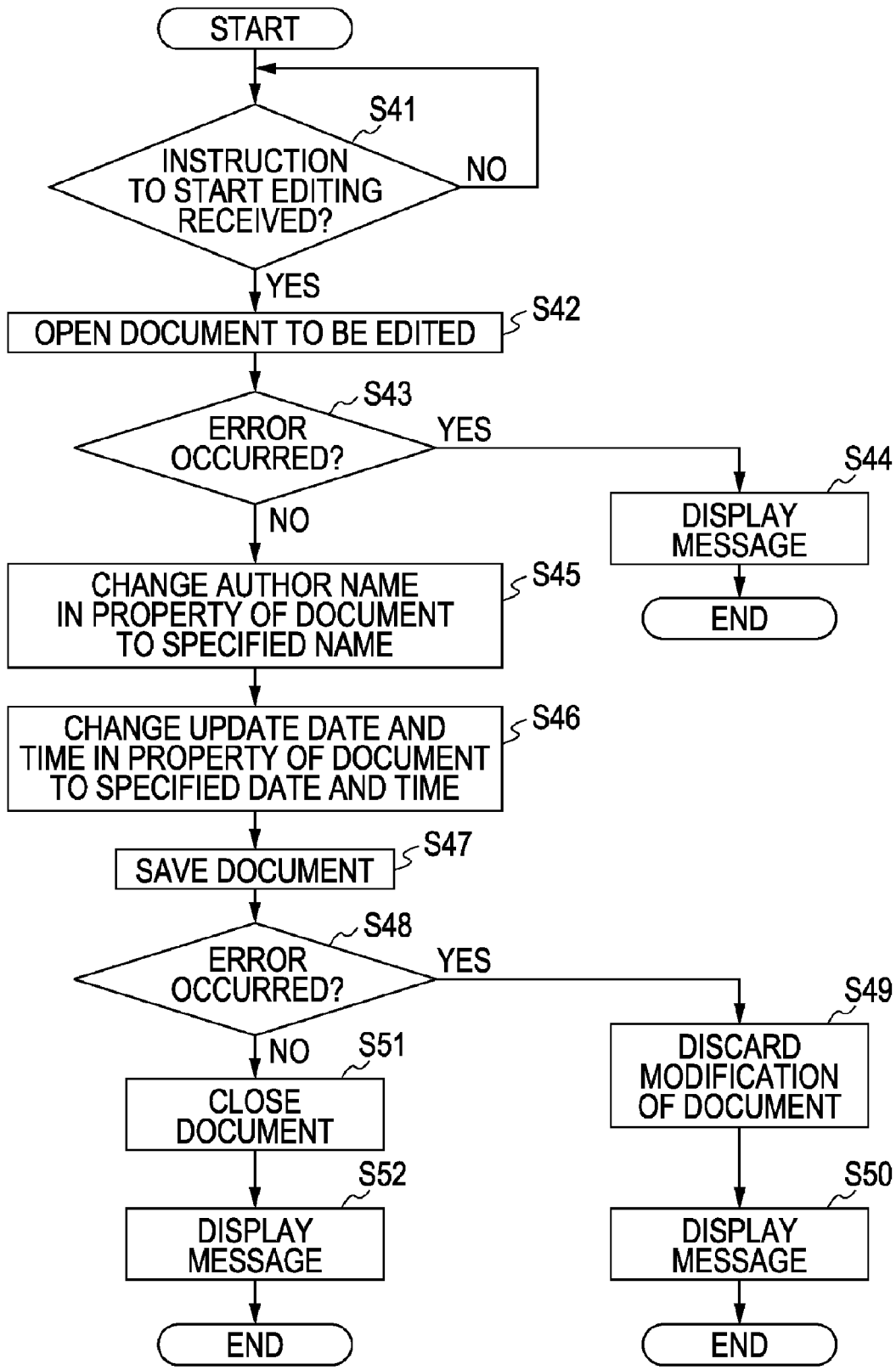
FIG. 11 is a flow chart of an exemplary operation performed by an edit application program (an application C) according to the first embodiment of the present invention.

FIG. 11 is a flow chart of an exemplary operation performed by the edit application program (application C) 123. The edit application program 123 is used for changing an author name of a document to a specified name. In addition, the edit application program 123 can change an update date and time to a specified date and time. In general, the edit application program 123 is used by an administrator of documents when the administrator performs a maintenance operation.

As illustrated in FIG. 11, the edit application program 123 waits until the user 2 operates the user interface 101 of the MFP 100 and instructs to start editing the digital document 1000 using the edit application program 123 (step S41). When an editing operation of the digital document 1000 using the edit application program 123 is started, the edit application program 123 opens the digital document 1000 to be edited using the document manipulation API 201 (step S42).

Subsequently, the edit application program 123 determines whether an error, such as an open error of the digital document 1000 due to the absence of the digital document 1000, occurs or not (step S43). If an error has occurred, the edit application program 123 displays a message indicating that information on, for example, the user interface 101 (step S44) and completes the processing.

However, if any error has not occurred, the edit application program 123 attempts to change the author name in a property field of the digital document 1000 to be edited to a specified name using the document manipulation API 201 (step S45). In addition, the edit application program 123 attempts to change the update date and time of the document 1000 to a specified date and time using the document manipulation API 201 again (step S46).

Subsequently, the edit application program 123 saves the digital document 1000 using the document manipulation API 201 (step S47). The edit application program 123 then determines whether an error has occurred (step S48). If an error has occurred, the edit application program 123 discards the digital document 1000 to be edited (step S49) and displays a message indicating that information on, for example, the user interface 101 (step S50). Thereafter, the processing is completed.

However, if an error has not occurred, the edit application program 123 determines that editing has been completed normally. The edit application program 123 then closes the digital document 1000 (step S51). Thereafter, the edit application program 123 displays a message indicating that the digital document 1000 is edited normally on, for example, the user interface 101 (step S52). Thereafter, the processing is completed.

Figure 12:
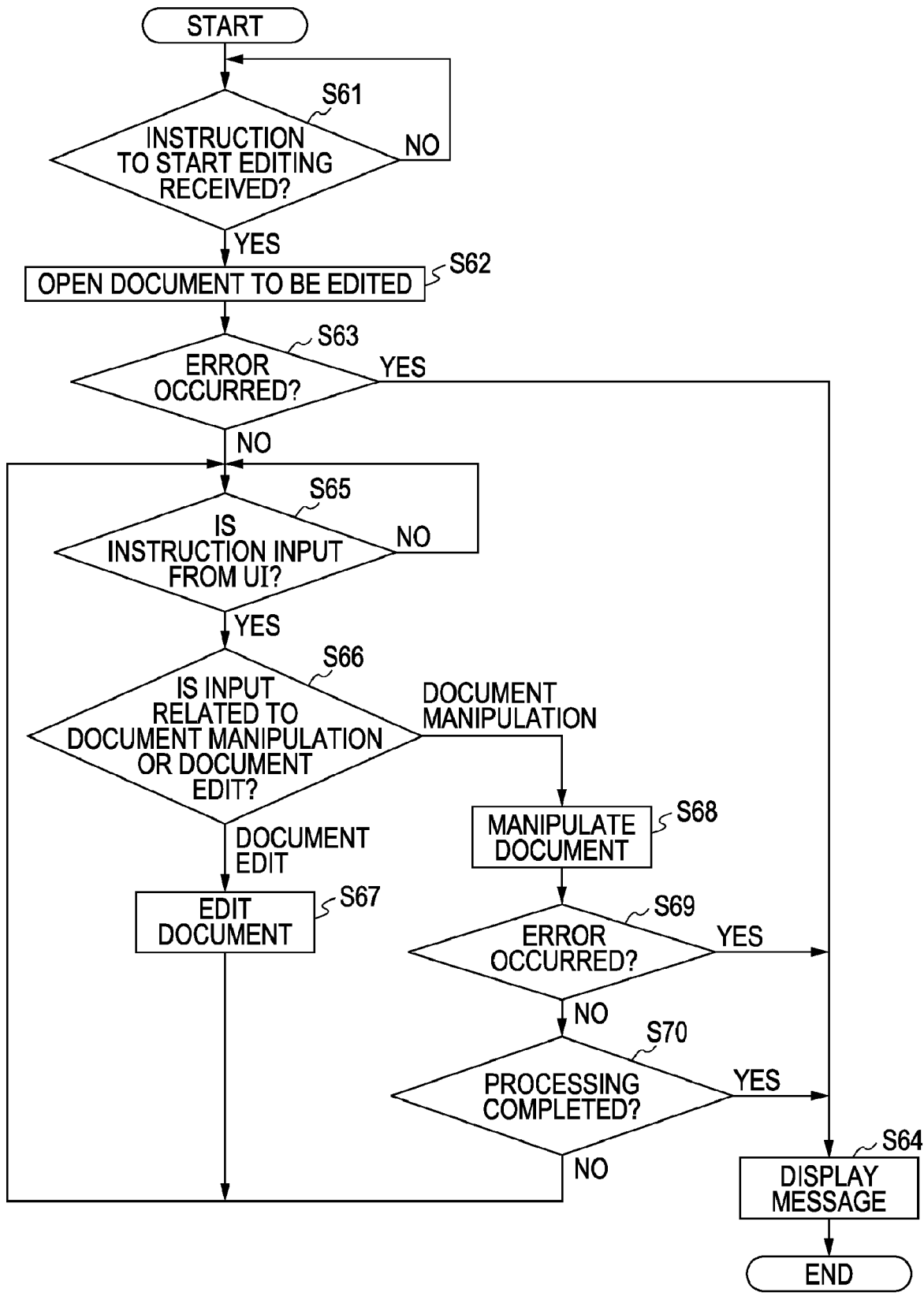
FIG. 12 is a flow chart of an exemplary operation performed by an edit application program (an application D) according to the first embodiment of the present invention.

FIG. 12 is a flow chart of an exemplary operation performed by the edit application program (application D) 124. The edit application program 124 is a multipurpose application that can freely perform all of the edit and manipulation operations of the MFP 100.

As illustrated in FIG. 12, the edit application program 124 waits until the user 2 operates the user interface 101 of the MFP 100 and instructs to start editing the digital document 1000 using the edit application program 124 (step S61). When an editing operation of the digital document 1000 using the edit application program 124 is started, the edit application program 121 opens the digital document 1000 to be edited using the document manipulation API 201 (step S62).

Subsequently, the edit application program 124 determines whether an error, such as an open error of the digital document 1000 due to the absence of the digital document 1000, occurs or not (step S63). If an error has occurred, the edit application program 124 displays a message indicating that information on, for example, the user interface 101 (step S64) and completes the processing.

However, if any error has not occurred, the edit application program 124 waits for a further input from the user interface 101 (step S65). Upon receiving an input from the user interface 101, the edit application program 124 determines whether the input is related to document editing or a document manipulation (step S66).

If the input is related to document editing, the edit application program 124 performs editing on the digital document 1000 using the document edit API 202 (step S67). Thereafter, the processing returns to step S65, where the edit application program 124 waits for the next input.

However, if the input is related to document manipulation, the edit application program 124 manipulates the digital document 1000 using the document manipulation API 201 (step S68). Subsequently, the edit application program 124 determines whether an error has occurred or not (step S69). If an error has occurred, the edit application program 124 displays a message indicating that information on, for example, the user interface 101 (step S64) and completes the processing.

However, if any error has not occurred, the edit application program 124 determines whether the operation is completed (step S70). If the operation has not been completed, the processing returns to step S65, from which the processing continues. In contrast, if the operation has been completed, the edit application program 124 displays a message indicating that the operation is completed normally on, for example, the user interface 101 (step S64). Thereafter, the processing is completed.

Figure 13:
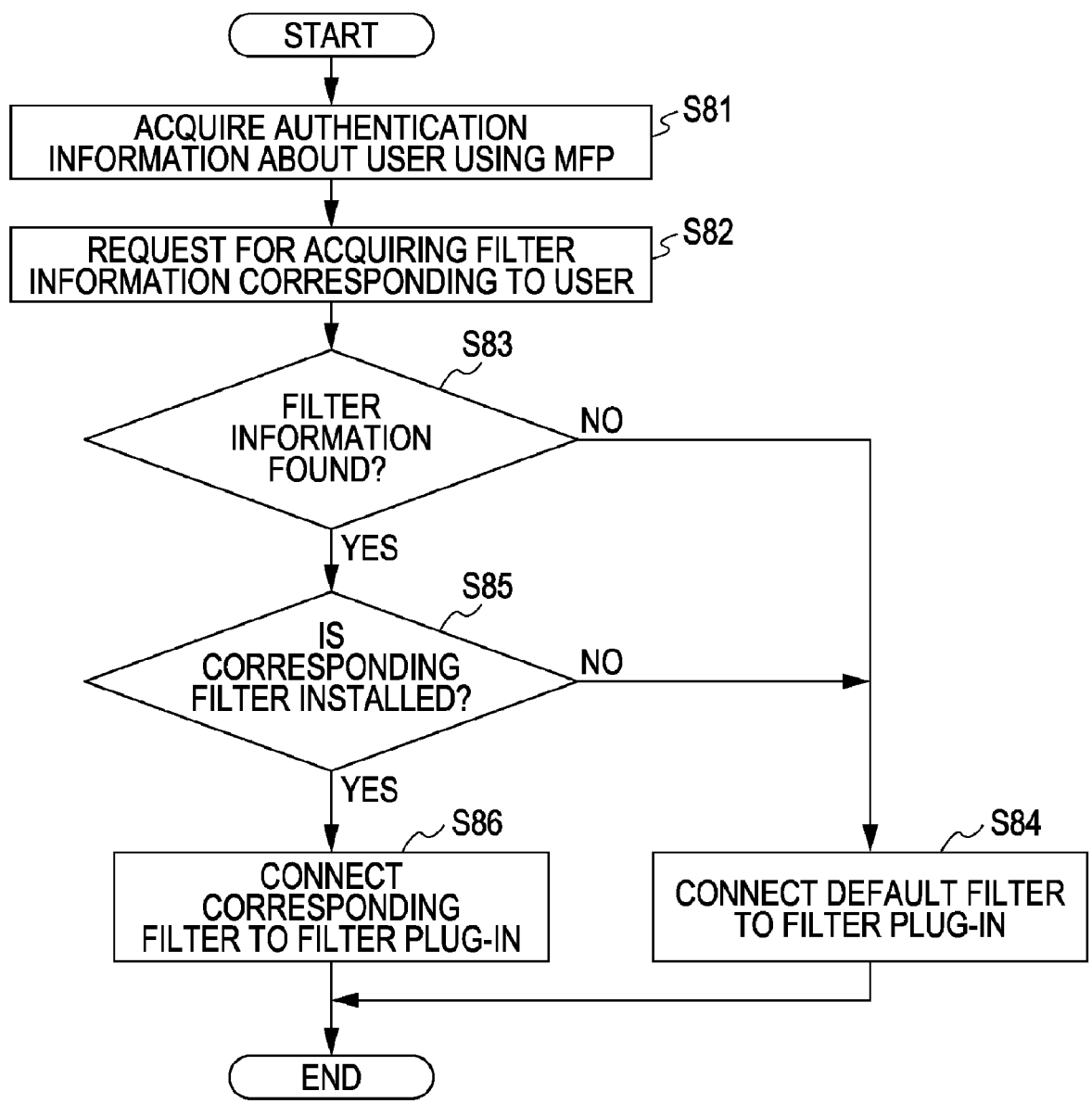
FIG. 13 is a flow chart of an exemplary operation performed by a plug-in filter control module according to the first embodiment of the present invention.

FIG. 13 is a flow chart of an exemplary operation performed by the plug-in filter control module 160.

When the user 2 instructs one of the applications in the application program group 110 to start or when the user 2 processes the digital document 1000 via a network, the user authentication module 140 performs a user authentication process so as to identify the user 2. In this way, according to the present embodiment, for example, user authentication means is achieved by the process performed by the user authentication module 140.

As illustrated in FIG. 13, the plug-in filter control module 160 acquires authentication information about a user who uses the MFP 100 via an application program used by the user 2 or the network module 130 (step S81).

Subsequently, the plug-in filter control module 160 delivers the user authentication information acquired in step S81 to the user filter information module 170 and requests the user filter information module 170 to acquire filter information about the user (step S82). As described above, the user filter information module 170 prestores information as to which filter is used for which user.

Subsequently, the plug-in filter control module 160 determines whether filter information about the user is found or not (step S83). If the filter information about the user is not found, the plug-in filter control module 160 selects a default filter and connects the default filter to the filter plug-in 210 (step S84). However, if the filter information about the user is found, the plug-in filter control module 160 determines whether a filter corresponding to the filter information is installed in the MFP 100 (step S85). If a filter corresponding to the filter information is not installed in the MFP 100, the plug-in filter control module 160 selects the default filter and connects the default filter to the filter plug-in 210 (step S84). However, if a filter corresponding to the filter information is installed in the MFP 100, the plug-in filter control module 160 selects that filter and connects the selected filter to the filter plug-in 210 (step S86) and completes the processing.

As described above, according to the present embodiment, for example, filter program selection means is achieved by executing the process in step S84 or S86.

According to the present embodiment, the application program and the document edit process are independent from those in another user session. Therefore, even when a plurality of users use different application programs at the same time, different filters are set and processing operations are performed. Accordingly, the operations of the application programs are not influenced by each other.

Figure 14:
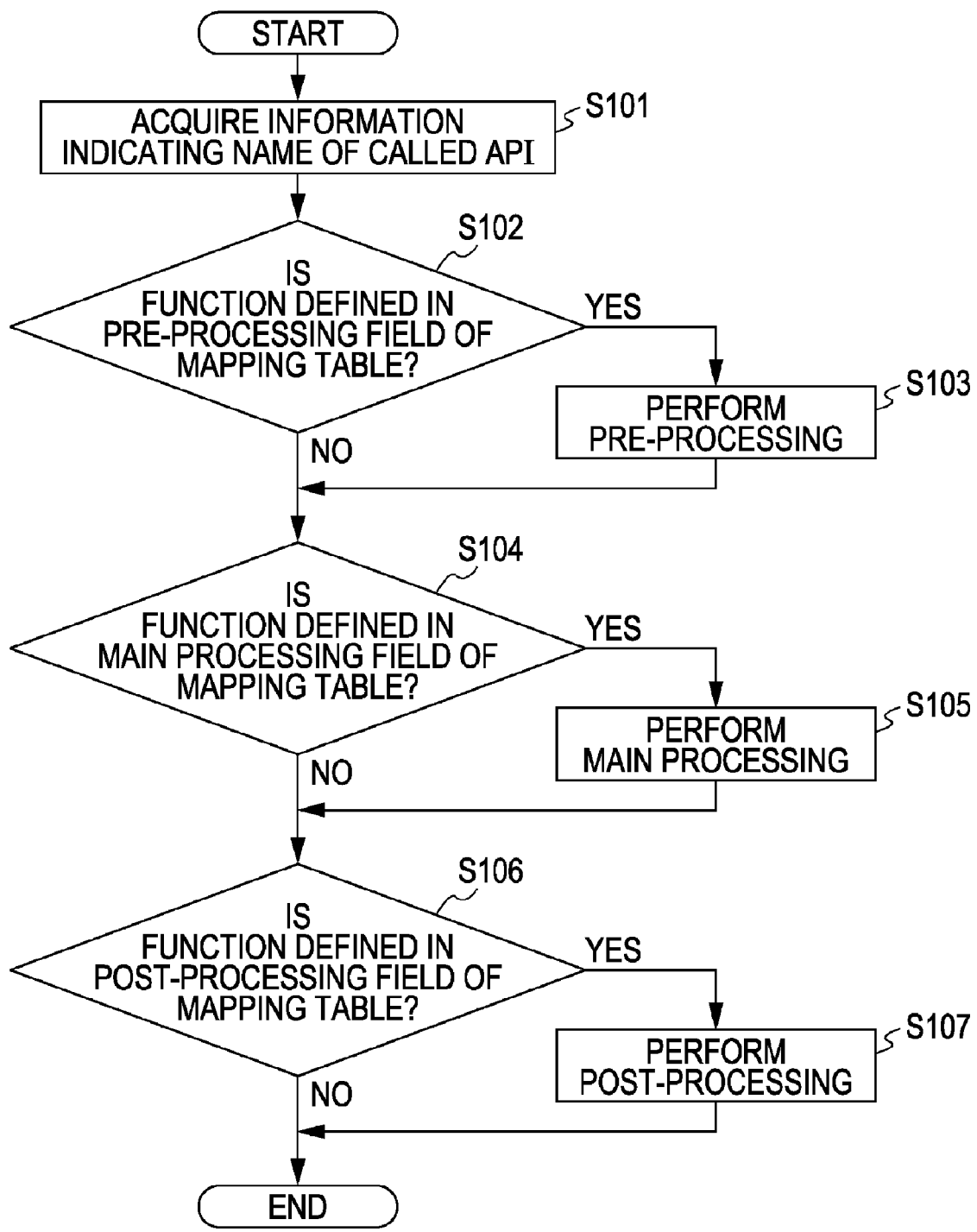
FIG. 14 is a flow chart of an exemplary operation performed by a filter plug-in according to the first embodiment of the present invention.

FIG. 14 is a flow chart of an exemplary operation performed by the filter plug-in 210.

When the document manipulation API 201 or the document edit API 202 is called by one of the applications of the application program group 110 or the network module 130, the filter plug-in 210 acquires information as to which one of the functions of the APIS is called (step S101).

Subsequently, the filter plug-in 210 refers to a mapping table of the filter connected thereto so as to determine whether a function is defined in the pre-processing field for the called function (step S102). If a function is defined in the pre-processing field for the called function, the filter plug-in 210 executes that function (step S103). In addition, the filter plug-in 210 generates information indicating that the pre-processing is executed. The generated information is used for generating a copy-forgery-inhibited pattern to be printed on a page obtained through the processing performed by the edit application programs 121 to 124. Thus, the user can recognize that a filter control (i.e., pre-processing) has been executed. Then, the processing proceeds to step S104. However, if any function is not defined in the pre-processing field, step S103 is skipped and the processing proceeds to step S104.

Subsequently, the filter plug-in 210 refers to the mapping table of the filter connected thereto so as to determine whether a function is defined in a main processing field of the called function (step S104). If a function is defined in the main processing field of the called function, the filter plug-in 210 executes that main function (step S105). In addition, the filter plug-in 210 generates information indicating that the main processing is executed. The generated information is used for generating a copy-forgery-inhibited pattern to be printed on a page obtained through the processing performed by the edit application programs 121 to 124. Thus, the user can recognize that a filter control (i.e., main processing) has been executed. Then, the processing proceeds to step S106. However, if any function is not defined in the main processing field, step S105 is skipped and the processing proceeds to step S106.

Subsequently, the filter plug-in 210 refers to the mapping table of the filter connected thereto so as to determine whether a function is defined in the post-processing field of the called function (step S106). If a function is defined in the post-processing field of the called function, the filter plug-in 210 executes that function (step S107). In addition, the filter plug-in 210 generates information indicating that the post-processing is executed. The generated information is used for generating a copy-forgery-inhibited pattern to be printed on a page obtained through the processing performed by the edit application programs 121 to 124. Thus, the user can recognize that a filter control (i.e., post-processing) has been executed. Then, the processing is completed. However, if any function is not defined in the post-processing field, the processing is completed without executing the process in step S107.

If nothing is defined in the mapping table, any process illustrated in FIG. 14 is not executed, in some cases.

As described above, according to the present embodiment, for example, function determination means is achieved by executing steps S102, S104, and S106. In addition, function limiting means is achieved by selectively executing steps S103, S105, and S107.

In the case where the general edit filter 301 is connected to the filter plug-in 210, since nothing is defined in the pre-processing fields, as illustrated in FIG. 4, the process in step S103 is not performed even when either the document manipulation API 201 or the document edit API 202 is called.

In contrast, since functions of the document manipulation library 221 and the document edit library 222 are defined in the main processing fields, the corresponding main process is performed in step S105 when either the document manipulation API 201 or the document edit API 202 is called. In addition, since nothing is defined in the post-processing fields, the process in step S107 is not performed even when either the document manipulation API 201 or the document edit API 202 is called.

In the case where the operation-log-attached general edit filter 302 is connected to the filter plug-in 210, since nothing is defined in the pre-processing fields, as illustrated in FIG. 5, the process in step S103 is not performed even when either the document manipulation API 201 or the document edit API 202 is called.

In contrast, since functions of the document manipulation library 221 and the document edit library 222 are defined in the main processing fields, the corresponding main process in step S105 is performed when either the document manipulation API 201 or the document edit API 202 is called. In addition, since a function X_Log( ) is defined in the post-processing field, the function X_Log( ) is called at a post-processing time. Thus, log information including all of the executed process logs is stored in the storage area.

In the case where the original information retention filter 303 is connected to the filter plug-in 210, when a function OpenDocument( ) is called, as illustrated in FIG. 6, a tentative copy document is generated in the pre-processing. In the main processing, the tentative copy document is opened. Subsequently, in the post processing, a function X_CallBackMessage( ) is called. The function X_CallBackMessage( ) informs the application program of the generation of the tentative copy document and the opening of the tentative copy document instead of the original document.

In addition, when a function SaveDocument( ) is called, the function X_CallBackMessage( ) is called so that the application program is informed that the tentative copy document is stored in place of the original document. Thereafter, a function X_SaveDocument( ) is called in the main processing so that the tentative copy document is stored.

In the case where the original information retention filter 304 is connected to the filter plug-in 210, when a function OpenDocument( ) is called, as illustrated in FIG. 7, a function X_Duplicate is called in the pre-processing so that the target document is copied as a backup document using an alias. In the main processing, a function OpenDocument( ) is called so that the target document is opened. Thereafter, processing is performed on the target document.

When a function CloseDocument( ) is called, a function X_CloseDocument( ) is called in the main processing so that the target document is closed. Thereafter, a function X_CheckMod( ) is called in the post-processing so that it is determined (examined) whether the target document is updated from the backup document. If the target document is not updated, the copy document generated as a backup document is deleted. However, if the target document is updated, the copy document generated as a backup document is not deleted.

In the case where the partial edit filter 305 is connected to the filter plug-in 210, when a function addObject( ) is called, as illustrated in FIG. 8, a function X_CallBackMessage( ) is called in the pre-processing so that the application program is informed that the call is invalid. In the main processing, no operation is performed.

Similarly, when a function deleteObject( ) is called, a function X_CallBackMessage( ) is called in the pre-processing so that the application program is informed that the call is invalid. In the main processing, no operation is performed.

Note that the other calls are processed in the same manner as illustrated in the mapping table contained in the operation-log-attached general edit filter 302 (refer to FIG. 5).

The effects of the above-described plug-in filter control module 160, filter plug-in 210, and filters 301 to 305 are described in detail next.

First Application Example

Two MFPs: MFP_A and MFP_B are installed in an office. Users freely installed edit applications in the two MFPs so as to use the edit applications. From some point of time, a digital document 1000 stored in the MFP_A is not allowed to be modified. A digital document 1000 stored in MFP_B is allowed to be freely edited. However, usage of the digital document 1000 stored in the MFP_B needs to be studied.

In such a situation, the administrator of the MFPs can install only the original information retention filter 303 in the MFP_A as a default filter, and install only the operation-log-attached general edit filter 302 in the MFP_B as a default filter.

Here, assume that a general user unintentionally executes an edit application program 123 that can update the author name and the update date and time of a document. The operation performed in such a case is described next.

As illustrated in step S42 of FIG. 11, when the user attempts to open the digital document 1000 for editing, a function OpenDocument( ) is acquired in step S101 of FIG. 14. Subsequently, since pre-processing is defined for the function OpenDocument( ) in a mapping table of the original information retention filter 303 illustrated in FIG. 6, a function X_Duplicate( ), which is a function of the document manipulation library 221, is called in step S103. Accordingly, the document manipulation library 221 makes a copy of the original document using an alias.

In addition, since main processing is defined for the function OpenDocument( ), a function X_OpenDocument( ), which is a function of the document manipulation library 221, is called in step S105. Accordingly, the document manipulation library 221 opens the copy document with the alias. Furthermore, since post-processing is defined for the function OpenDocument( ), a function X_CallBackMessage( ), which is a function of the document manipulation library 221, is called in step S107. Accordingly, the document manipulation library 221 displays the message "Editing is not allowed. The document has been opened as another document." for the general user via the edit application program 123.

Referring back to FIG. 11, in step S43, it is determined that no error has occurred. Thus, the processing proceeds to step S45. In step S45, a function WriteAuthorName( ) illustrated in FIG. 6 is called so that a process based on X_WriteAuthorName( ) (i.e., update of the author name) is performed on the copy document with the alias.

Similarly, in step S46, a function WriteModifiedDate( ) illustrated in FIG. 6 is called so that a process based on X_WriteModifiedDate( ) (i.e., update of the update date and time) is performed on the copy document with the alias.

When a function SaveDocument( ) is called in step S47, a function X_CallBackMessage( ) is called in pre-processing so that a message "The document is saved using an alias" is displayed for the user. Thereafter, a function X_SaveDocument( ) is called in main processing so that the copy document with an alias is saved. Like the above-described process, no error has occurred in this processing. Accordingly, in step S51, the document with an alias is closed. In step S52, a message indicating that the process is normally completed is displayed.

In comparison with the above-described operation, the operation performed when the MFP_B executes the edit application program 123 that can update the author name and the update date and time of a document is described next.

As illustrated in step S42 of FIG. 11, when the user attempts to open the digital document for editing, a function OpenDocument( ) is acquired in step S101 of FIG. 14. Subsequently, since no pre-processing is defined for the function OpenDocument( ) in a mapping table of the original information retention filter 303 illustrated in FIG. 5, a process in step S103 is not executed. In addition, since main processing is defined for the function OpenDocument( ), a function X_OpenDocument( ), which is a function of the document manipulation library 221, is called in step S105. Accordingly, the document manipulation library 221 opens the document to be edited. Furthermore, since post-processing is defined for the function OpenDocument( ), a function X_Log( ) is called in step S107. Accordingly, the processing is logged (saved).

Referring back to FIG. 11 again, in step S43, it is determined that no error has occurred. Thus, the processing proceeds to step S45. In step S45, a function WriteAuthorName( ) illustrated in FIG. 5 is called so that a process based on X_WriteAuthorName( ) (i.e., update of the author name) is performed on the document to be edited. Thereafter, a function X_Log( ) is called in post-processing. Accordingly, the update of the author name is logged (saved).

Similarly, in step S46, a function WriteModifiedDate( ) illustrated in FIG. 5 is called so that a process based on X_WriteModifiedDate( ) (i.e., update of the update date and time) is performed on the document to be edited. Thereafter, a function X_Log( ) is called in post-processing. Accordingly, the update of the author name is logged (saved).

When a function SaveDocument( ) is called in step S47, a function X_SaveDocument( ) is called in main processing so that the document to be edited is saved. Thereafter, a function X_Log( ) is called in post-processing so that the save operation of the document is logged. Like the above-described process, no error has occurred in this processing. Accordingly, in step S51, the document to be edited is closed. In step S52, a message indicating that the process is normally completed is displayed. For these operations, a function X_Log( ) is called in the post-processing and is logged.

As described above, according to the present embodiment, the filters 301 to 305 optimal for an intended purpose are set for each of the MFPs 100. Accordingly, the functions of the edit application programs 121 to 124 can be limited in accordance with the intended purpose for each of the MFPs 100 whatever functions the edit application programs 121 to 124 have.

Second Application Example

An MFP MFP_C is installed in an office. A user C is an administrator who manages all documents in the office. In some cases, the user C edits the author name and the update date and time of a document stored in the MFP_C. A user D modifies the format of a document stored in the MFP_C (e.g., a color change in part of the document) and prints the document. However, the user D is not accustomed to that operation, and therefore, may mistakenly operate the MFP_C.

In such a situation, the administrator of the MFP_C can install the general edit filter 301 and the partial edit filter 305 in the MFP_C. In addition, the administrator can set the following information in the user filter information module 170: information instructing that the general edit filter 301 is connected when the user C uses the MFP_C and information instructing that the partial edit filter 305 is connected when the user D uses the MFP_C.

Here, assume that the user D unintentionally executes an edit application program 124 on the MFP_C and deletes or adds a component in addition to modifying the format of a digital document 1000 stored in the MFP_C. The operation performed in such a case is described next.

When the user D logs in in order to use the edit application program 124 of the MFP_C, the controller 102 performs a user authentication process using the user authentication module 140.

After the edit application program 124 starts, the plug-in filter control module 160, in step S81 of FIG. 13, acquires authentication information about the user D via the edit application program 124. In step S82, the plug-in filter control module 160 supplies the authentication information about the user D to the user filter information module 170. The user filter information module 170 returns the partial edit filter 305, which is filter information, to the plug-in filter control module 160. Since the partial edit filter 305 is installed in the MFP_C, the processing proceeds to step S86. In step S86, the plug-in filter control module 160 connects the partial edit filter 305 to the filter plug-in 210.

Subsequently, in step S62 of FIG. 12, the user D instructs the MFP_C to open the digital document 1000 using the edit application program 124. Accordingly, an API OpenDocument( ) in a mapping table in the partial edit filter 305 illustrated in FIG. 8 is called. Thereafter, a function X_OpenDocument( ) is called in main processing so that the document to be edited is opened. When the user D attempts to change the color of a component (e.g., a logo) of the document, a function PathFillColor( ) of the document edit API 202 is called. Thus, a function X_PathFillColor( ) is called in main processing. In this way, the user D can change the color of the logo.

If the user D attempts to delete the logo, a function deleteObject( ) of the document edit API 202 is called in step S67. At that time, a function X_CallBackMessage( ) is called in pre-processing so that a message indicating that deletion of the component is not allowed is sent to the user D via the edit application program 124. In such a case, no operation is performed in the main processing.

Similarly, if the user D attempts to add a new logo, a function addObject( ) of the document edit API 202 is called in step S67. At that time, a function X_CallBackMessage( ) is called in pre-processing so that a message indicating that addition of the component is not allowed is sent to the user D via the edit application program 124. The save operation of the document and termination processing are performed even in this case.

The operation performed when the user C uses the edit application program 124 in the MFP_C is described next.

When the user C logs in in order to use the edit application program 124 of the MFP_C, the controller 102 performs a user authentication process using the user authentication module 140.

After the edit application program 124 starts, the plug-in filter control module 160, in step S81 of FIG. 13, acquires authentication information about the user C via the edit application program 124. In step S82, the plug-in filter control module 160 supplies the authentication information about the user C to the user filter information module 170. The user filter information module 170 returns the general edit filter 301, which is filter information, to the plug-in filter control module 160. Since the general edit filter 301 is installed in the MFP_C, the processing proceeds to step S86. In step S86, the plug-in filter control module 160 connects the general edit filter 301 to the filter plug-in 210. Subsequently, the general edit filter directly performs document editing and document manipulation in response to an instruction from the user C.

As described above, according to the present embodiment, a plurality of filters are installed in one MFP, and one of the filters is set in accordance with an intended purpose of a user. Accordingly, the functions of the edit application programs 121 to 124 can be limited for each user whatever functions the edit application programs 121 to 124 have.

While the present embodiment has been described with reference to the case where a predetermined processing logic is provided to the filter plug-in 210 and each of the filters 301 to 305 includes a mapping table, each of the filters 301 to 305 may include a processing logic and a mapping table, and therefore, the filters 301 to 305 may have different logics.

In addition, while the present embodiment has been described with reference to the filters 301 to 305 having three-stage processing: pre-processing, main processing, and post-processing, the number of stages may be decreased or increased. Furthermore, a plurality of functions may be called in each processing.

Still furthermore, the type of filter is not limited to those illustrated in FIG. 3. Any filter optimal for the purpose can be added (installed) and deleted (uninstalled) in and from the MFP 100.

While the present embodiment has been described with reference to the case where a copy-forgery-inhibited pattern is formed on a paper sheet in order to indicate that some processing is performed, any other information on the sheet that can indicate that the processing is performed may be used in place of the copy-forgery-inhibited pattern.

In addition, the application framework 120 (the application platform) may determine whether the function executed by the edit application programs 121 to 124 can be restricted by the filters. In such a case, the filters are applied (selected) in response to an instruction from the application framework 120.

Second Embodiment

A second embodiment of the present invention is described below. In the first embodiment, the APIs 201 and 202 for providing functions of manipulating and editing the digital document 1000 to users are structurally and clearly separated from the libraries 221 and 222 that provide actual functions. The general edit filters 301 to 305 are plugged in between the two types of function. When the platform of the controller 102 of the MFP 100 is developed from scratch, this design can be easily applied. However, in practice, it is difficult to develop the platform from scratch. Accordingly, the case where this concept is applied to existing platforms is described next. According to the second embodiment, the function of the controller 102 is partially different from that of the first embodiment. Therefore, similar numbering will be used in describing the present embodiment as was utilized above in describing the first embodiment illustrated in FIGS. 1 to 14, and the descriptions are not repeated.

The second embodiment is described in detail below with reference to the accompanying drawings.

Figure 15:
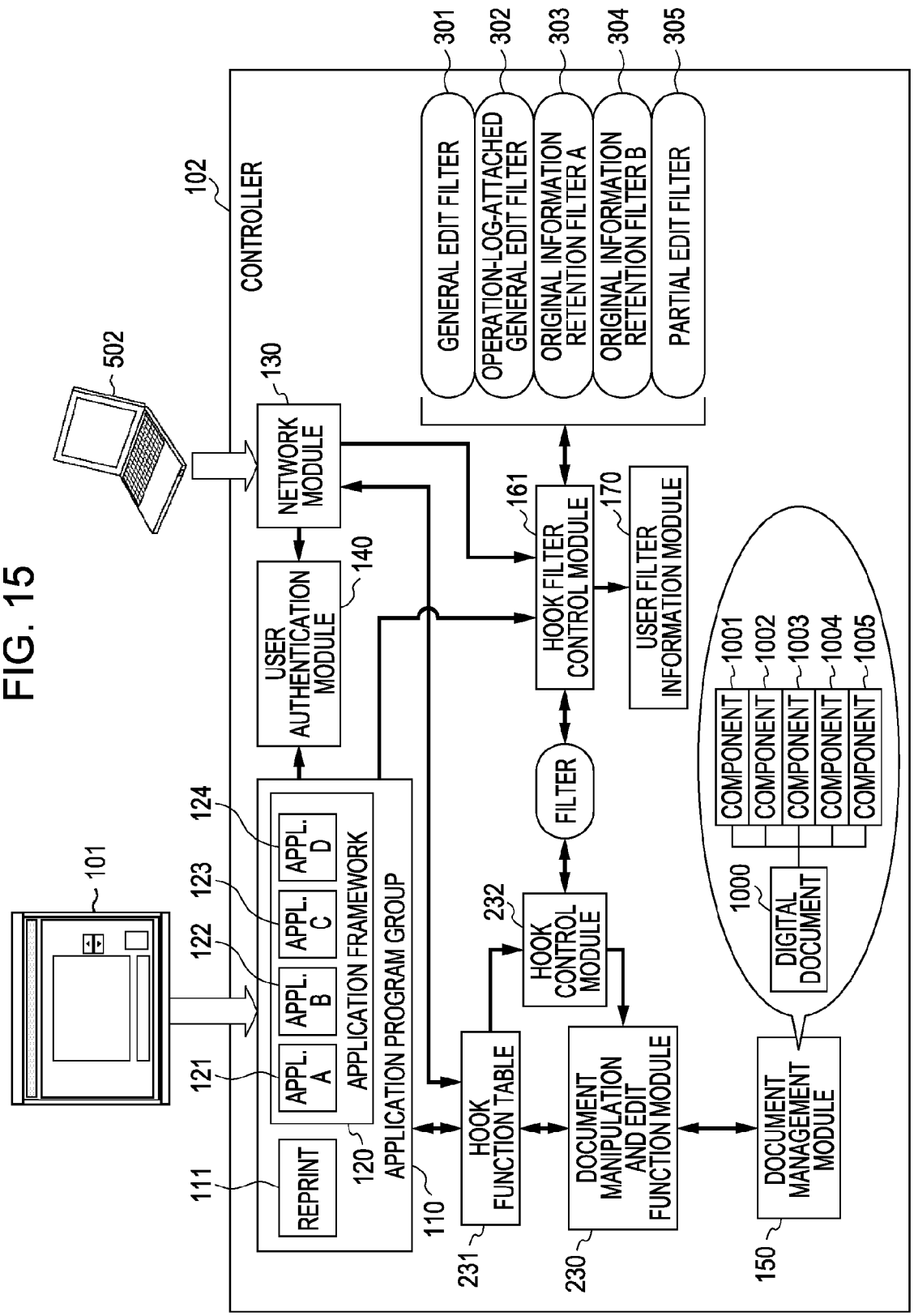
FIG. 15 is a block diagram of exemplary software configuration of a controller incorporated in an MFP according to a second embodiment of the present invention.

FIG. 15 is a block diagram of exemplary software configuration of a controller 102 incorporated in an MFP. When one of the applications of the application program group 110 or the network module 130 is started, a hook filter control module 161 supplies one of filters 301 and 305 to a hook control module 232, that is, the hook filter control module 161 sets one of filters 301 and 305 in a hook control module 232.

A document manipulation and edit function module 230 is used by each of the applications of the application program group 110 or the network module 130 when a digital document 1000 is manipulated and edited. In FIG. 15, for ease of understanding, the document manipulation and edit function module 230 is composed of only one module. However, the document manipulation and edit function module 230 may include a plurality of sub-modules. In such a case, the functions may be distributed to these sub-modules.

A hook function table 231 includes a definition of functions that are controlled by the filters among all of the document manipulation functions and document edit functions provided by the document manipulation and edit function module 230. All of operations performed by the application program group 110 and the network module 130 for the document manipulation and edit function module 230 are linked to the hook function table 231. The hook function table 231 is stored in a storage medium, such as the HDD 403, of the controller 102. Thus, according to the present embodiment, for example, table storage means is achieved using the storage medium, such as the HDD 403 that stores the hook function table 231.

When the document manipulation and edit function module 230 is accessed, a hook control module 232 hooks the document manipulation and edit function module 230 using the hook function table 231. Thus, the hook control module 232 provides a function in accordance with a filter connected thereto. That is, when the document manipulation and edit function module 230 is accessed, the hook control module 232 extracts a desired function using a filter and controls the extracted function in accordance with a filter connected thereto.

Figure 16:
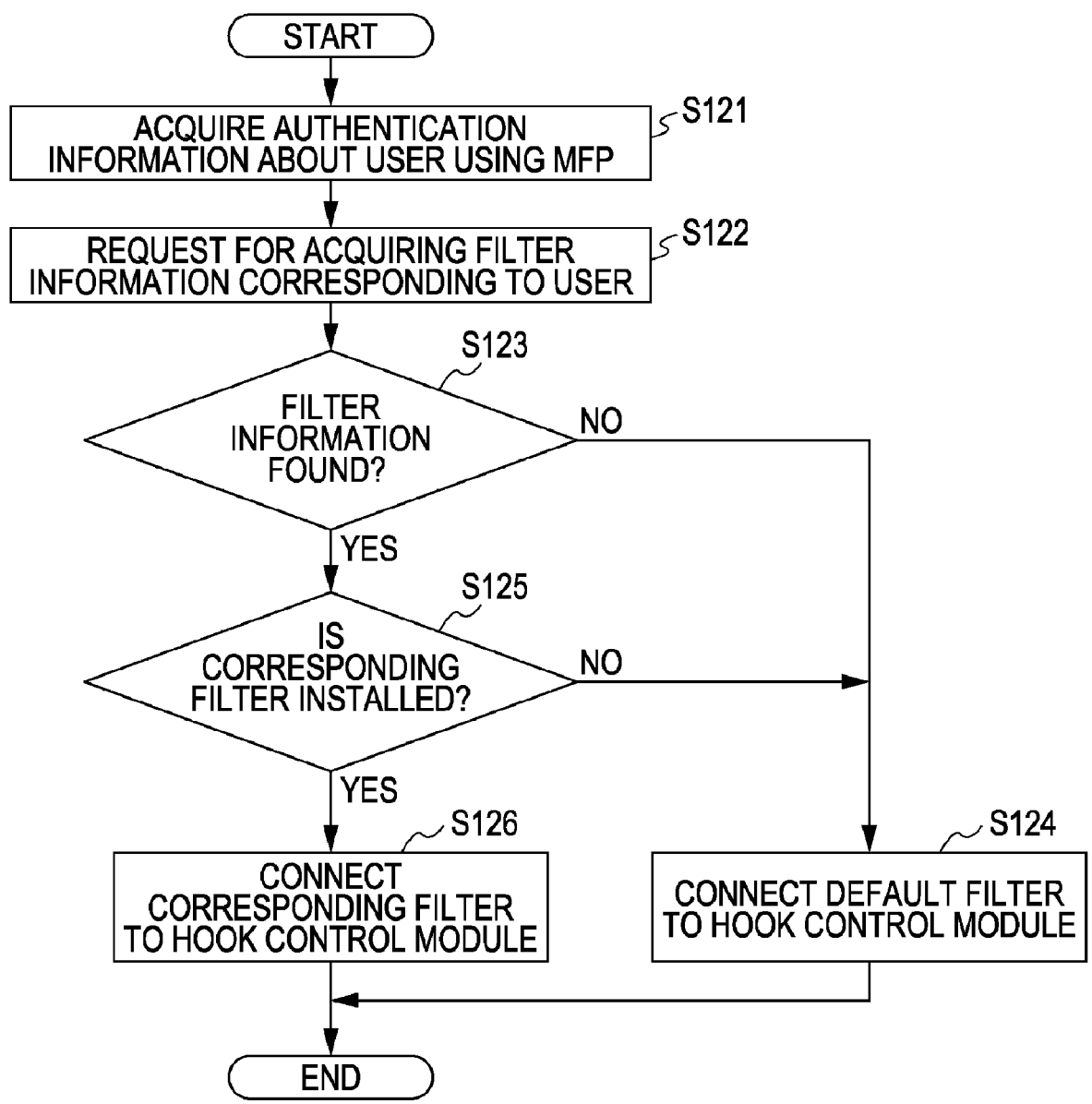
FIG. 16 is a flow chart of an exemplary operation performed by a hook filter control module according to the second embodiment of the present invention.

FIG. 16 is a flow chart illustrating an exemplary operation performed by the hook filter control module 161. Only a connection point of the filter is different from the operation performed by the plug-in filter control module 160 according to the first embodiment (refer to FIG. 13). When the user 2 instructs to start one of the application programs of the application program group 110 or processes the digital document 1000 via a network, the user authentication module 140 identifies the user 2 through a user authentication process.

As illustrated in FIG. 16, the hook filter control module 161 acquires authentication information about the user 2 who uses the MFP 100 via an application program used by the user 2 or the network module 130 (step S121).

Subsequently, the hook filter control module 161 delivers the user authentication information acquired in step S121 to the user filter information module 170 and requests the user filter information module 170 to acquire filter information about the user 2 (step S122).

Subsequently, the hook filter control module 161 determines whether filter information about the user is found or not (step S123). If the filter information about the user is not found, the hook filter control module 161 selects a default filter and connects the default filter to the hook control module 232 (step S124). However, if the filter information about the user is found, the hook filter control module 161 determines whether a filter corresponding to the filter information is installed in the MFP 100 (step S125). If a filter corresponding to the filter information is not installed in the MFP 100, the hook filter control module 161 selects the default filter and connects the default filter to the hook control module 232 (step S124).

However, if a filter corresponding to the filter information is installed in the MFP 100, the hook filter control module 161 selects that filter and connects the selected filter to the hook control module 232 (step S126) and completes the processing.

Figure 17:
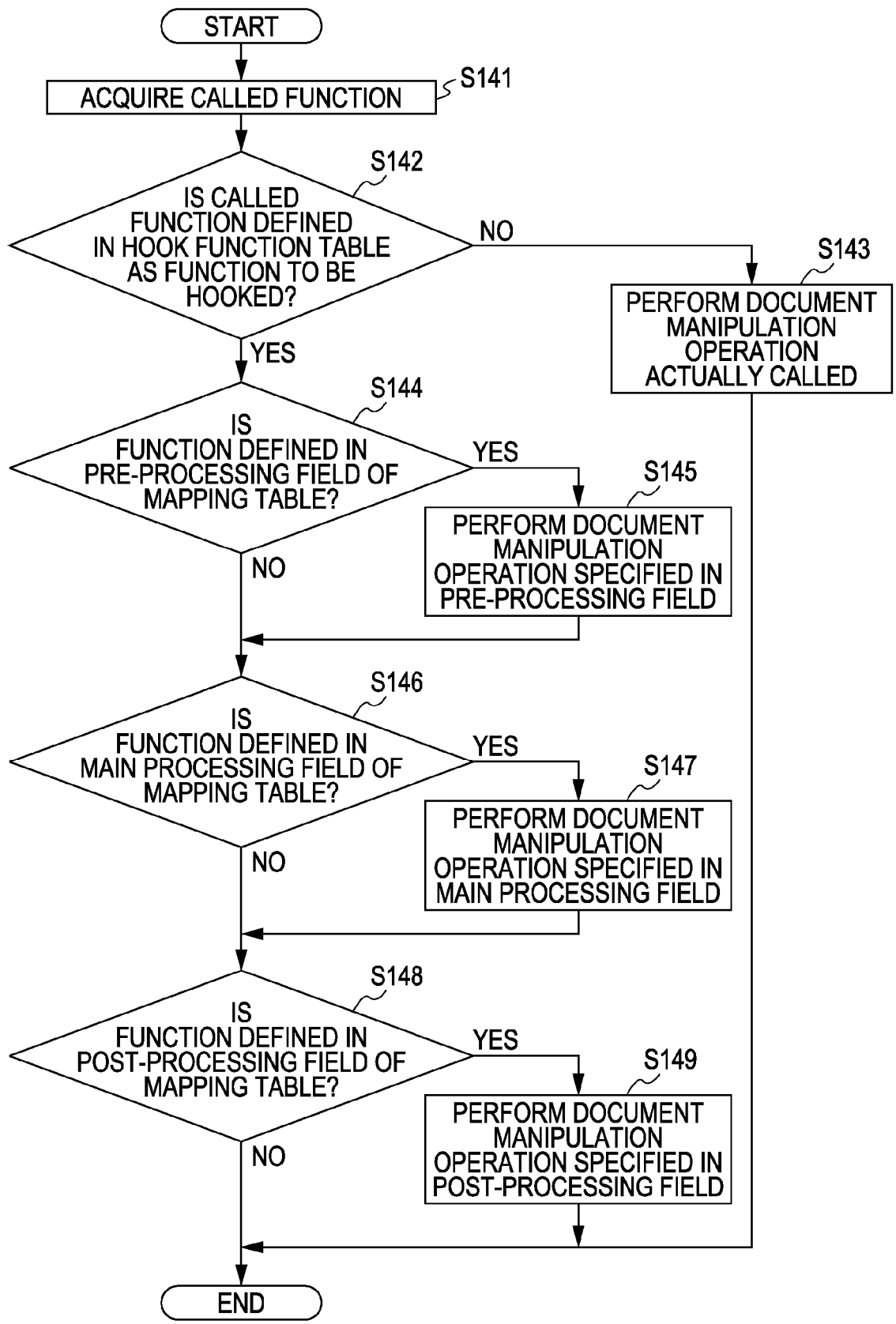
FIG. 17 is a flow chart of an exemplary operation performed by a hook control module according to the second embodiment of the present invention.

FIG. 17 is a flow chart of an exemplary operation performed by the hook control module 232.

The application program group 110 or the network module 130 calls a function of the document manipulation and edit function module 230 in order to use the document manipulation and edit function module 230. At that time, the function is transferred to the hook control module 232 via the hook function table 231. Thus, the processing is started.

The hook control module 232 acquires the called function (step S141). Thereafter, the hook control module 232 determines whether the called function is defined in the hook function table 231 as a function to be hooked (step S142). If the called function is not defined in the hook function table 231 as a function to be hooked, the hook control module 232 causes the document manipulation and edit function module 230 to execute the called function (step S143) and completes the processing.

However, if the called function is defined in the hook function table 231 as a function to be hooked, the processing proceeds to step S144. In step S144, the hook control module 232 refers to a mapping table connected thereto so as to determine whether a function is defined in the pre-processing field of the called function (step S144). If a function is defined in the pre-processing field of the called function, the hook control module 232 causes the document manipulation and edit function module 230 to execute that function in pre-processing (step S145). In addition, the hook control module 232 generates information indicating that the pre-processing is executed. The generated information is used for generating a copy-forgery-inhibited pattern to be printed on a page obtained through the processing performed by the edit application programs 121 to 124. Thus, the user can recognize that a filter control (i.e., pre-processing) has been executed. Then, the processing proceeds to step S146. However, if any function is not defined in the pre-processing field, step S145 is skipped and the processing proceeds to step S146.

Subsequently, the hook control module 232 refers to the mapping table of the filter connected thereto so as to determine whether a function is defined in a main processing field of the called function (step S146). If a function is defined in the main processing field of the called function, the hook control module 232 causes the document manipulation and edit function module 230 to execute that main function in main processing (step S147). In addition, the hook control module 232 generates information indicating that the main processing is executed. The generated information is used for generating a copy-forgery-inhibited pattern to be printed on a page obtained through the processing performed by the edit application programs 121 to 124. Thus, the user can recognize that a filter control (i.e., main processing) has been executed. Then, the processing proceeds to step S148. However, if any function is not defined in the main processing field, step S147 is skipped and the processing proceeds to step S148.

Subsequently, the hook control module 232 refers to the mapping table of the filter connected thereto so as to determine whether a function is defined in the post-processing field of the called function (step S148). If a function is defined in the post-processing field of the called function, the hook control module 232 causes the document manipulation and edit function module 230 to execute that function (step S149). In addition, the hook control module 232 generates information indicating that the post-processing is executed. The generated information is used for generating a copy-forgery-inhibited pattern to be printed on a page obtained through the processing performed by the edit application programs 121 to 124. Thus, the user can recognize that a filter control (i.e., post-processing) has been executed. The processing is then completed. However, if any function is not defined in the post-processing field, the processing is completed without executing the process in step S149.

If nothing is defined in the mapping table, any process illustrated in FIG. 17 is not executed, in some cases.

As described above, according to the present embodiment, for example, document edit and manipulation means is achieved by the document manipulation and edit function module 230. In addition, access control means is achieved by executing step S142 and steps S144 to S149.

The operation performed when each of the general edit filters 301 to 305 is connected to the hook control module 232 is similar to that performed when each of the general edit filters 301 to 305 is connected to the filter plug-in 210 in the first embodiment. Therefore, the description is not repeated.

As described above, according to the present embodiment, like the first embodiment, a filter optimal for the user's purpose is set in each MFP. Accordingly, the functions of the edit application programs 121 to 124 can be limited in accordance with the intended purpose for each MFP whatever functions the edit application programs 121 to 124 have.

In addition, a plurality of filters are installed in one MFP, and an optimal filter for the user's purpose is preset. Accordingly, the functions of the edit application programs 121 to 124 can be limited in accordance with the intended purpose for each user whatever functions the edit application programs 121 to 124 have.

Furthermore, according to the present embodiment, the hook function table 231 is extracted from a document manipulation and edit function, and a function call is hooked. Accordingly, even when the document manipulation and edit function has a controller platform having a structure in which interfaces (APIs) are not separated from the libraries, the present invention can provide an advantage the same as that of the first embodiment.

Third Embodiment

A third embodiment of the present invention is described below. In the first embodiment, if a filter to be used is predetermined, calls to the document manipulation library 221 and the document edit library 222 corresponding to calls to the document manipulation API 201 and the document edit API 202 are uniquely determined. In contrast, according to the third embodiment, after a specific API is called, mappings of subsequent calls to APIs to the libraries can be dynamically changed. Thus, according to the present embodiment, the function of the controller 102 is partially different from that of the first embodiment. Therefore, similar numbering will be used in describing the present embodiment as was utilized above in describing the first embodiment illustrated in FIGS. 1 to 14, and the detailed descriptions are not repeated.

Figure 18:
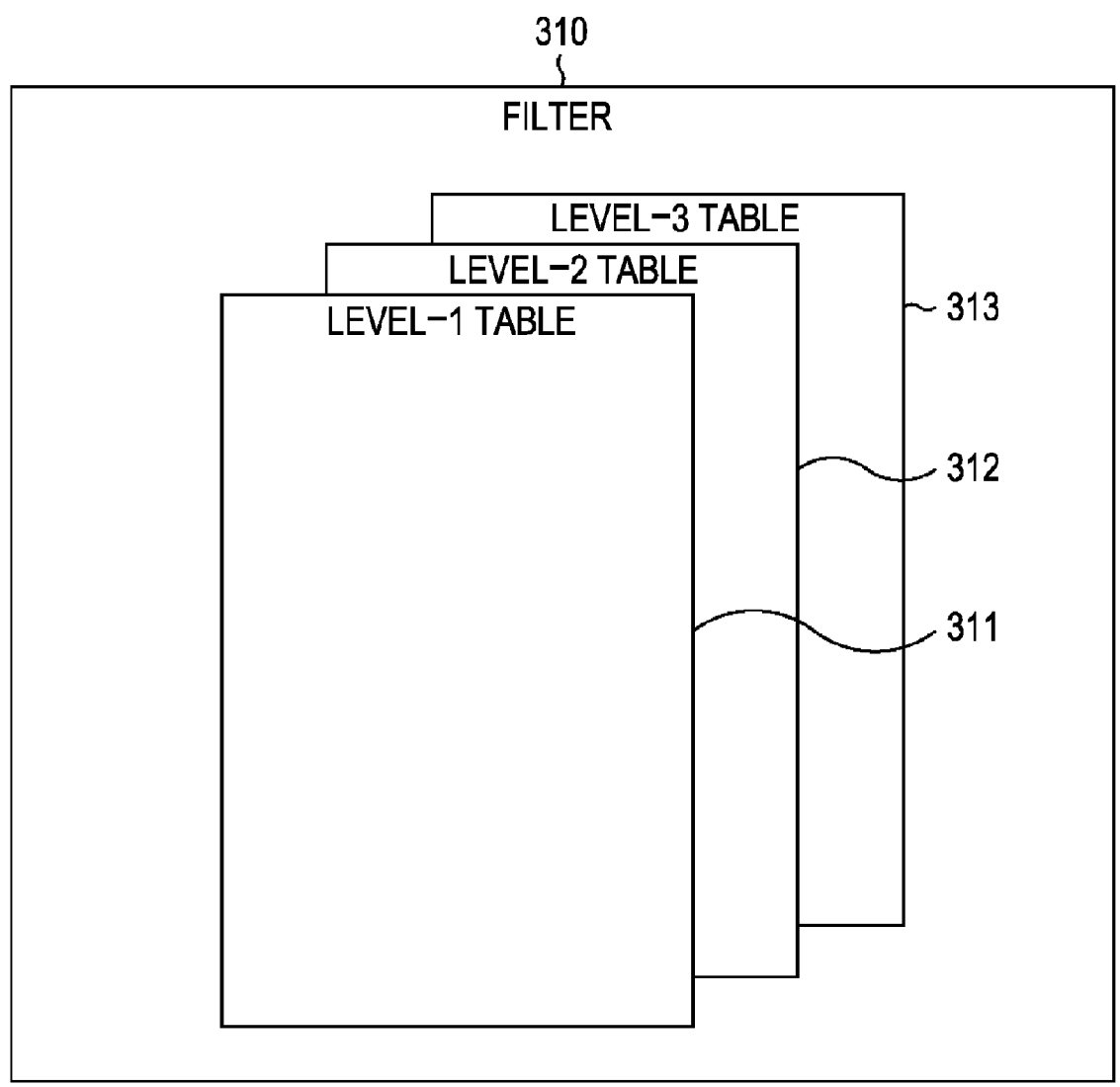
FIG. 18 is a schematic illustration of an exemplary filter structure including a plurality of mapping tables according to a third embodiment of the present invention.

FIG. 18 is a schematic illustration of an exemplary filter structure including a plurality of mapping tables.

In FIG. 18, a filter 310 corresponds to the filters 301 to 305 described in the first embodiment. In an example illustrated in FIG. 18, the filter 310 includes three mapping tables 311, 312, and 313 in three different levels. FIG. 19 illustrates an example of the mapping table 311 in level 1. FIG. 20 illustrates an example of the mapping table 312 in level 2. FIG. 21 illustrates an example of the mapping table 313 in level 3.

Figure 22:
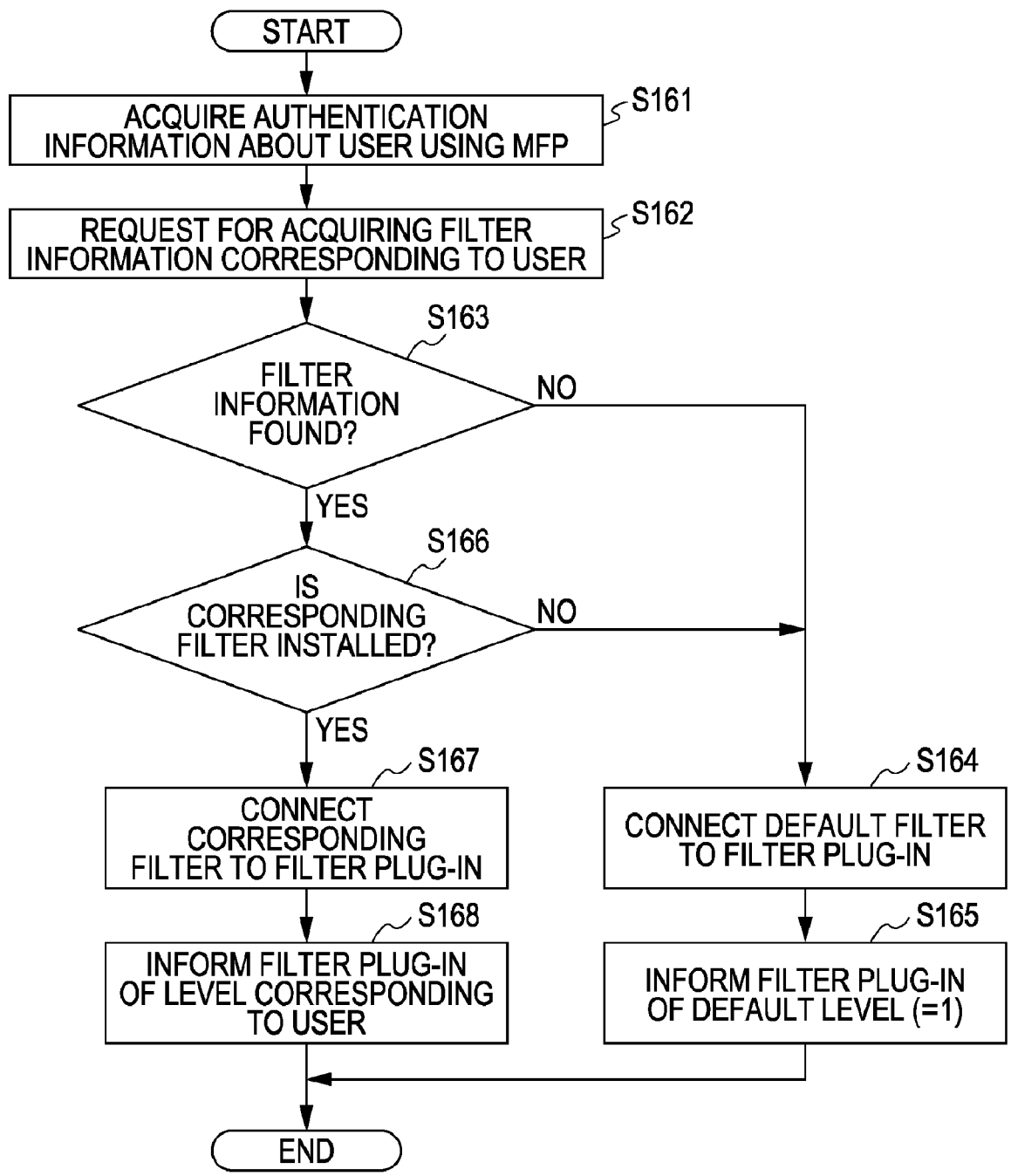
FIG. 22 is a flow chart illustrating an exemplary operation performed by a plug-in filter control module according to the third embodiment of the present invention.

FIG. 22 is a flow chart illustrating an exemplary operation performed by a plug-in filter control module.

As illustrated in FIG. 22, the plug-in filter control module acquires authentication information about a user 2 who uses the MFP 100 via an application program used by the user 2 or the network module 130 (step S161).

Subsequently, the plug-in filter control module delivers the user authentication information acquired in step S161 to the user filter information module 170, and requests the user filter information module 170 to acquire filter information about the user 2 (step S162). The user filter information module 170 prestores information as to which filter is used for which user and information as to from which level the process starts. This information is input by an administrator in advance.

Subsequently, the plug-in filter control module determines whether filter information about the user is found or not (step S163). If the filter information about the user is not found, the plug-in filter control module selects a default filter and connects the default filter to the filter plug-in (step S164). Thereafter, the plug-in filter control module delivers a default level value (e.g., "1") to the filter plug-in (step S165). The level value indicates which mapping table of the filter connected to the filter plug-in is used. The processing is then completed.

However, if, in step S163, the filter information about the user is found, the plug-in filter control module determines whether a filter corresponding to the filter information is installed in the MFP 100 (step S166). If a filter corresponding to the filter information is not installed in the MFP 100, the processing proceeds to step S164, where the plug-in filter control module connects a default filter to the filter plug-in (step S164).

However, if a filter corresponding to the filter information is installed in the MFP 100, the plug-in filter control module connects that filter to the filter plug-in (step S167). In addition, the plug-in filter control module delivers the level value that has been acquired by requesting acquisition of filter information about the user in step S162 to the filter plug-in (step S168). The processing is then completed.

FIG. 23 is a flow chart illustrating an exemplary operation performed by the filter plug-in.

When the document manipulation API 201 or the document edit API 202 is called by the application program group 110 or the network module 130, the filter plug-in acquires information as to which function of the API is called (step S181).

Subsequently, the filter plug-in refers to a mapping table corresponding to the current level value among mapping tables of the filter connected thereto. Thus, the filter plug-in determines whether a function is defined in the pre-processing field of the called function in the referred mapping table (step S182). For example, if the current level value is "1", the filter plug-in refers to the mapping table 311 in the level 1. Note that, in first processing, the current level value is not set. Therefore, the filter plug-in considers the level value delivered from the plug-in filter control module in step S165 or S168 of FIG. 22 to be the current level value.

If a function is defined in the pre-processing field, the filter plug-in executes that function as pre-processing of the current level (step S183). In addition, the filter plug-in generates information indicating that the pre-processing is executed. The generated information is used for generating a copy-forgery-inhibited pattern to be printed on a page obtained through the processing performed by the edit application programs 121 to 124. Thus, the user can recognize that a filter control (i.e., pre-processing) has been executed. Then, the processing proceeds to step S184. However, if any function is not defined in the pre-processing field, step S183 is skipped and the processing proceeds to step S184.

Subsequently, the filter plug-in refers to the mapping table so as to determine whether a function is defined in a main processing field of the called function (step S184). If a function is defined in the main processing field, the filter plug-in considers the function to be a main function in the current level and executes that main function (step S185). In addition, the filter plug-in generates information indicating that the main processing is executed. The generated information is used for generating a copy-forgery-inhibited pattern to be printed on a page obtained through the processing performed by the edit application programs 121 to 124. Thus, the user can recognize that a filter control (i.e., main processing) has been executed. The processing then proceeds to step S186. However, if any function is not defined in the main processing field, step S185 is skipped and the processing proceeds to step S186.

Subsequently, the filter plug-in refers to the mapping table so as to determine whether a function is defined in the post-processing field of the called function (step S186). If a function is defined in the post-processing field of the called function, the filter plug-in considers the function to be a post-processing function in the current level and executes that function (step S187). In addition, the filter plug-in generates information indicating that the post-processing is executed. The generated information is used for generating a copy-forgery-inhibited pattern to be printed on a page obtained through the processing performed by the edit application programs 121 to 124. Thus, the user can recognize that a filter control (i.e., post-processing) has been executed. Then, the processing proceeds to step S188. However, if any function is not defined in the post-processing field, step S187 is skipped and the processing proceeds to step S188.

The filter plug-in determines whether information indicating a level value is defined in a switching level field of the called function (step S188). According to the present embodiment, examples of the information indicating a level value include a level value itself and a level value determined at a start time. If some information indicating a level value is defined in the switching level field of the called function, the filter plug-in stores the level value based on that information as the current level value (step S189). The processing is then completed. However, if nothing is defined in the switching level field, the current level remains unchanged. If no information indicating a level value is defined in the switching level field, step S189 is skipped. The processing is then completed.

An application example of the present embodiment is described next.

After processing is started in the level 1 and the function OpenDocument( ) is called, only the function X_OpenDocument( ) that is defined in the main processing field of the mapping table 311 for the level 1 illustrated in FIG. 19 is executed. Subsequently, when the function WriteModifiedDate( ) is called for modifying the update date and time, the function X_WriteModifiedDate( ) that is defined in the main processing field of the function WriteModifiedDate( ) is directly called. However, the function X_CallBackMessage( ) that is defined in the post-processing field displays a message "This process is not allowed to run twice." Thereafter, the current level is changed from "1" to "2".

In the level 2, as illustrated by the level-2 mapping table 312 in FIG. 20, the function X_Log( ) is called for all of the pre-processing of the called function, and a log is recorded. Thereafter, if the function WriteModifiedDate( ) is called, nothing is executed in the main processing. In the post-processing, the function X_CallBackMessage( ) is called so as to display, for example, a message "The process is invalid. All of the subsequent processes are stopped." Thereafter, the current level is changed from "2" to "3".

In the level 3, as illustrated by the level-3 mapping table 313 in FIG. 21, if a function other than CloseDocument( ) is called, nothing is executed in the main processing, and only a message can be displayed. In contrast, if the function Close-Document( ) is called, the function X_CloseDocument( ) is then called so that the document is closed. Thereafter, the current level is changed from "3" to "1", which is a level at a processing start time.

As described above, according to the present embodiment, the filter 310 includes three mapping tables 311, 312, and 313 for three levels. In addition, even when one filter is used, the mapping table is switched if a specific API is called. Accordingly, mapping to a function library (the document manipulation library 221 or the document edit library 222) can be dynamically changed for the subsequent API call. Furthermore, since the level at a processing start time can be changed on a user-to-user basis, a more flexible control can be provided.

It should be noted that the number of mapping tables (levels) contained in a filter is not limited to three.

According to the present embodiment, a filter program that restricts the function executed by an application program running on the application platform is prestored. If a function executed by the application program is a restricted function of the filter program, that function is restricted on the basis of the filter program. Accordingly, an edit or manipulation operation on a stored digital document can be adaptively restricted in accordance with an intended purpose. For example, an edit or manipulation operation on a stored digital document can be restricted on an apparatus-to-apparatus basis or a user-to-user basis.

Other Embodiments

The units of the digital document processing apparatus and steps of the digital document processing method according to the above-described embodiments of the present invention can be achieved by the operation of a program stored in a RAM or ROM of a computer. In such a case, the program and a computer-readable storage medium that stores the program are encompassed by the present invention.

In addition, the embodiments of the present invention can be achieved as a system, an apparatus, a method, a program, or a storage medium. More specifically, the present invention may be applied to a system including a plurality of devices or an apparatus including a single device.

According to the present invention, the software programs (corresponding to the programs described in the embodiments using the flow charts in FIGS. 9 to 14, FIGS. 16, 17, 22, and 23) are directly or remotely supplied to the system or the apparatus. Subsequently, the system or the apparatus reads out and executes the code of the supplied program. In this way, the present invention can be also achieved.

In such a case, the program code itself read out of the storage medium realizes the functions of the above-described embodiments. Therefore, the storage medium storing the program code can also realize the present invention.

Accordingly, any form of the program can be applied to the present invention. For example, the program may be a program executed using an object code or an interpreter, or script data supplied to the OS.

Examples of the storage medium for supplying the program code include a floppy (trademark) disk, a hard disk, an optical disk, an MO (magnetooptical disk), a CD-ROM, a CD-R (CD recordable), a CD-RW (CD-rewritable), a magnetic tape, a nonvolatile memory card, a ROM, and a DVD (digital versatile disc) including a DVD-ROM and a DVD-R.

Alternatively, the program code may be supplied by accessing a Web page on the Internet using a browser in a client computer and downloading the computer program of the present invention or an archive file including an auto-install function from the Web page to a storage medium, such as a hard disk.

In addition, the program code of the program of the present invention may be divided into a plurality of files, which may be downloaded from different Web pages. In other words, a WWW (world wide web) server and an FTP (file transfer protocol) server that allow a plurality of users to download a program file that achieves the functions of the present invention are also included in the present invention.

Additionally, the program according to the present invention can be encrypted and stored into a storage medium, such as a CD-ROM, to deliver it to users. A user who satisfies a predetermined criterion can download key information for decrypting the encryption from a Web page on the Internet. By using the key information, the user can install the encrypted program in a computer and can execute the program to achieve the present invention.

The functions of the above-described embodiments can be realized by another method in addition to executing the program code read out by the computer. For example, the functions of the above-described embodiments can be realized by a process in which an operating system (OS) running on the computer executes some of or all of the functions in the above-described embodiments under the control of the program code.

The present invention can also be achieved by writing the program code read out of the storage medium to a memory of an add-on expansion board of a computer or a memory of an add-on expansion unit connected to a computer. The functions of the above-described embodiments can be realized by a process in which, after the program code is written, a CPU in the add-on expansion board or in the add-on expansion unit executes some of or all of the functions in the above-described embodiments under the control of the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-042434 filed Feb. 22, 2007, which is hereby incorporated by reference herein in its entirety.

What is claimed is:
1. A digital document processing apparatus comprising:
a digital document storage unit configured to store a digital document; and
a program storage unit configured to store an application program used for controlling the digital document, running on an application platform, an application programming interface (API) for manipulating the digital document called from the application program, a document manipulation library for manipulating the digital document called via the API, and a filter plug-in defined between the API and the document manipulation library;
wherein the filter plug-in is connected to a filter, and
wherein the connected filter contains a mapping table in which rules for changing the API called by the application program to an API to be actually called; and
a control unit configured to cause the filter plug-in connected to a filter to acquire the API for manipulating the document called by the application program, cause the filter plug-in to change the API for manipulating the document to the API to be actually called based on the mapping table in the filter, call the document manipula- tion library via the changed API to be actually called, and manipulate the digital document.

2. A method comprising:

storing a digital document;

storing an application program used for controlling the digital document, which is running on an application platform, an application programming interface (API) for manipulating the digital document called from the application program, a document manipulation library for manipulating the digital document called via the API, and a filter plug-in defined between the API and the document manipulation library;

wherein the filter plug-in is connected to a filter, and where in the connected filter contains a mapping table in which rules for changing the API called by the application program to an API to be actually called; and causing the filter plug-in connected to a filter to acquire the API for manipulating the document called by the application program, causing the filter plug-in to change the API for manipulating the document to the API to be actually called based on the mapping table in the filter, calling the document manipulation library via the changed API to be actually called, and manipulating the digital document.

3. The digital document processing apparatus according to claim 1, wherein the API to be actually called includes pre-processing, main processing and post-processing, and wherein the control unit calls the document manipulation library via at least one of APIs of the three kinds of processing according to definition of the API to be actually called, and manipulates the digital document.

4. The digital document processing apparatus according to claim 3, wherein, in a case where an API is not defined in the pre-processing or the post-processing of the API to be actually called, the control unit calls the document manipulation library via only an API of the main processing and manipulates the digital document.

5. The digital document processing apparatus according to claim 4, wherein the API for manipulating the document is an API of an open document for opening the digital document, and wherein the control unit calls the document manipulation library via an X_Duplicate defined in the pre-processing of the API to be actually called, generates a copy of the digital document, calls the document manipulation library via an X_OpenDocument defined in the main processing of the API to be actually called, opens the copied digital document, calls the document manipulation library via an X_CallBackMessage defined in the post-processing of the API to be actually called, and notifies the application program that not the digital document but the copied digital document is generated and opened.

6. The digital document processing apparatus according to claim 1, further comprising:

an authentication unit configured to authenticate and identify a user; and a determination unit configured to determine a filter to connect based on authentication information transmitted from the authentication unit.

7. A digital document processing apparatus comprising:

a digital document storage unit configured to store a digital document;

a program storage unit configured to store an application program used for controlling the digital document which is running on an application platform, an application programming interface (API) for manipulating the digital document called from the application program, a document manipulation library for manipulating the digital document called via the API, and a filter plug-in defined between the API and the document manipulation library; and a control unit configured to cause the filter plug-in to acquire the API for manipulating the document called by the application program, cause the filter plug-in to change the API for manipulating the document to the API to be actually called, call the document manipulation library via the changed API to be actually called, and manipulate the digital document.

8. The method according to claim 2, wherein the API to be actually called includes pre-processing, main processing and post-processing, and wherein the document manipulation library is called via at least one of APIs of the three kinds of processing according to definition of the API to be actually called, and the digital document is manipulated.

9. The method according to claim 8, wherein, in a case where an API is not defined in the pre-processing or the post-processing of the API to be actually called, the document manipulation library is called via only an API of the main processing and digital document is manipulated.

10. The method according to claim 9, wherein the API for manipulating the document is an API of an open document for opening the digital document, and wherein the document manipulation library is called via an X_Duplicate defined in the pre-processing of the API to be actually called, a copy of the digital document is generated, the document manipulation library is called via an X_OpenDocument defined in the main processing of the API to be actually called, the copied digital document is opened, the document manipulation library is called via an X_CallBackMessage defined in the post-processing of the API to be actually called, and the application program is notified that not the digital document but the copied digital document is generated and opened.

11. The method according to claim 2, further comprising:

authenticating and identifying a user; and determining a filter to connect based on authentication information transmitted from the authentication step.

12. A method comprising:

storing a digital document;

storing an application program used for controlling the digital document, which is running on an application platform, an application programming interface (API) for manipulating the digital document called from the application program, a document manipulation library for manipulating the digital document called via the API, and a filter plug-in defined between the API and the document manipulation library; and causing the filter plug-in to acquire the API for manipulating the document called by the application program, causing the filter plug-in to change the API for manipulating the document to the API to be actually called, calling the document manipulation library via the changed API to be actually called, and manipulating the digital document.

13. A computer program stored in a non-transitory computer-readable storage medium, including instructions which, when executed by apparatus, causes the apparatus to perform operations comprising:

storing a digital document;

storing an application program used for controlling the digital document, which is running on an application platform, an application programming interface (API)

for manipulating the digital document called from the application program, a document manipulation library for manipulating the digital document called via the API, and a filter plug-in defined between the API and the document manipulation library;

wherein the filter plug-in is connected to a filter, and where in the connected filter contains a mapping table in which rules for changing the API called by the application program to an API to be actually called; and causing the filter plug-in connected to a filter to acquire the API for manipulating the document called by the application program, causing the filter plug-in to change the API for manipulating the document to the API to be actually called based on the mapping table in the filter, calling the document manipulation library via the changed API to be actually called, and manipulating the digital document.

14. The computer program stored in a non-transitory computer-readable storage medium according to claim 13, wherein the API to be actually called includes pre-processing, main processing and post-processing, and wherein the document manipulation library is called via at least one of APIs of the three kinds of processing according to definition of the API to be actually called, and the digital document is manipulated.

15. The computer program stored in a non-transitory computer-readable storage medium according to claim 14, wherein, in a case where an API is not defined in the pre-processing or the post-processing of the API to be actually called, the document manipulation library is called via only an API of the main processing and digital document is manipulated.

16. The computer program stored in a non-transitory computer-readable storage medium according to claim 15, wherein the API for manipulating the document is an API of an open document for opening the digital document, and wherein the document manipulation library is called via an X_Duplicate defined in the pre-processing of the API to be actually called, a copy of the digital document is generated, the document manipulation library is called via an X_OpenDocument defined in the main processing of the API to be actually called, the copied digital document is opened, the document manipulation library is called via an X_CallBackMessage defined in the post-processing of the API to be actually called, and the application program is notified that not the digital document but the copied digital document is generated and opened.

17. The computer program stored in a non-transitory computer-readable storage medium according to claim 13, further comprising:

authenticating and identifying a user; and determining a filter to connect based on authentication information transmitted from the authentication step.

18. A computer program stored in a non-transitory computer-readable storage medium, including instructions which, when executed by apparatus, causes the apparatus to perform operations comprising:

storing a digital document;

storing an application program used for controlling the digital document, which is running on an application platform, an application programming interface (API) for manipulating the digital document called from the application program, a document manipulation library for manipulating the digital document called via the API, and a filter plug-in defined between the API and the document manipulation library;

causing the filter plug-in to acquire the API for manipulating the document called by the application program, causing the filter plug-in to change the API for manipulating the document to the API to be actually called, calling the document manipulation library via the changed API to be actually called, and manipulating the digital document.

* * * * *